United States Patent [19]
Asai et al.

[11] Patent Number: 6,005,599
[45] Date of Patent: Dec. 21, 1999

[54] VIDEO STORAGE AND DELIVERY APPARATUS AND SYSTEM

[75] Inventors: Mitsuo Asai, Kokubunji; Yoshihiro Takiyasu, Kodaira; Koichi Shibata, Kobubunji; Mikiko Sato, Matsudo; Atsushi Saito, Ichikawa; Takehisa Hayashi, Sagamihara; Masaru Igawa, Kokubunji, all of Japan

[73] Assignee: Hitachi, Ltd., Tokyo, Japan

[21] Appl. No.: 08/363,331

[22] Filed: Dec. 23, 1994

[30] Foreign Application Priority Data

Dec. 27, 1993 [JP] Japan ..................................... 5-330528
Nov. 24, 1994 [JP] Japan ..................................... 6-289436

[51] Int. Cl.$^6$ ................................................. H04N 7/173
[52] U.S. Cl. ................................................. 348/7; 455/4.2
[58] Field of Search .................................. 348/7, 12, 13, 348/6; 455/4.2, 5.1; 395/200.49, 200.48, 200.42; 709/217, 218, 219; H04N 7/16, 7/173, 7/10, 7/15

[56] References Cited

U.S. PATENT DOCUMENTS

| | | | |
|---|---|---|---|
| 4,816,905 | 3/1989 | Tweedy et al. | 358/86 |
| 4,941,040 | 7/1990 | Pocock et al. | 358/86 |
| 4,994,909 | 2/1991 | Graves et al. | 358/86 |
| 5,051,822 | 9/1991 | Rhoades | 358/86 |
| 5,355,162 | 10/1994 | Yazolino et al. | 348/11 |
| 5,508,732 | 4/1996 | Bottomley et al. | 348/7 |
| 5,515,511 | 5/1996 | Nguyen et al. | 395/200.49 |
| 5,636,139 | 6/1997 | McLaughlin et al. | 395/200.49 |

OTHER PUBLICATIONS

*Communications of the ACM*, "The Internet and Interactive Television", L. Press, Dec., No. 12, New York, U.S.
*International Conference on Communications*, "A Store–And–Forward Architecture for Video–On–Demand Service", A.D. Gelman, et al., vol. 2 of 3, Jun. 23–26, 1991, Sheraton–Denver Technological Center.
*Globecom '90, IEEE Global Telecommunications Conference & Exhibition*, "Video on Demand: Is It Feasible?", W.D. Sincoskie, et al, vol. 1 of 3, Dec. 2 to Dec. 5, 1990.
*IEEE Communications Magazine*, "Interactive Video on Demand", D. Deloddere, et al., May 1994, No. 5, New York, U.S.

*Primary Examiner*—Chris Grant
*Attorney, Agent, or Firm*—Antonelli, Terry, Stout & Kraus, LLP

[57] ABSTRACT

In a video storage and delivery apparatus and corresponding system, video data items are simultaneously supplied to a plurality of users while guaranteeing the time axis and the picture quality of the video data. The apparatus includes a frame address table which indicates a storage location in the apparatus of each frame of video data to start a special reproduction or a reproduction at a desired frame and a control unit controlling a switch bus connecting a plurality of video storage and delivery apparatuses to a plurality of channels so as to conduct data transfers via the switch bus between the apparatuses and between video reproduction devices of the users. From an optical disk data storage storing video data, a plurality of video data items are read in a timesharing fashion to be temporarily stored in a magnetic disk device or a semiconductor memory, thereby delivering the video data items therefrom to the users.

2 Claims, 43 Drawing Sheets

FIG. 7

| CONNECTIONS | SOURCE | DESTINATION | PRIORITY |
|---|---|---|---|
| C1 | HD1 | OUTPUT A | B |
| C2 | INPUT C | HD 2 | A |
| C3 | CD 1 | HD 1 | A |
| C4 | HD 1 | OUTPUT B | A |
| ⋮ | ⋮ | ⋮ | ⋮ |
| TOTAL (bps) | | | |

160 QOS CONTROL TABLE

*1 4500rpm = 75/g = 1/13.4ms
*2 59*512B/13.3ms = 2.16MB/s

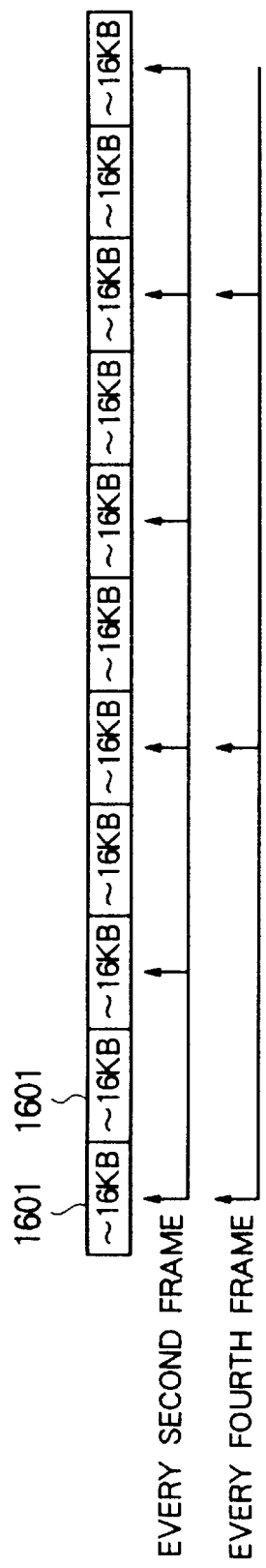
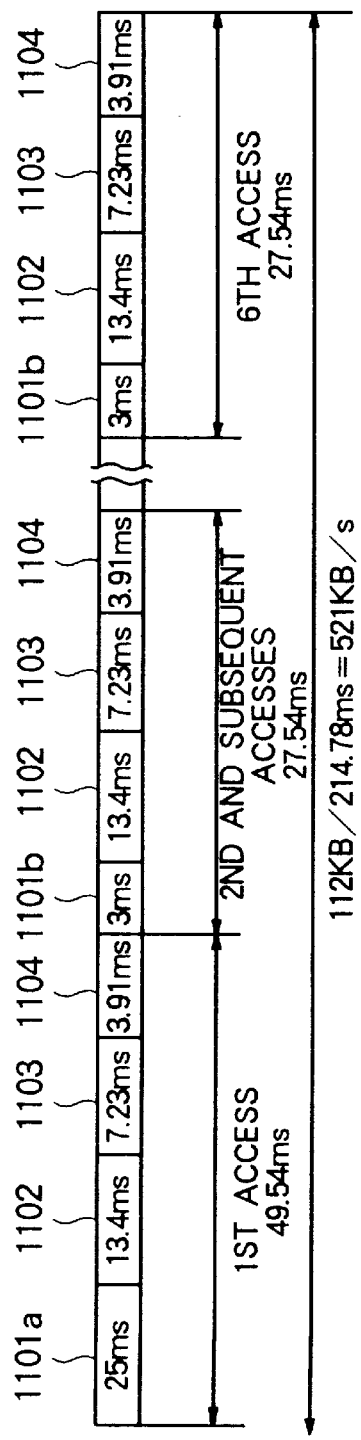

FIG. 16C

| ACCESS METHOD | ACCESS UNIT | THROUGHPUT | CLIENT SIDE ||
|---|---|---|---|---|
| | | | TIME PROGRESS RATIO (USER TIME SPEED) | FRAME RATE RATIO |
| NORMAL | 256KB | 1154.7KB/s | 1 | 1 |
| EVERY 2ND FRAME | ~16KB | 521KB/s | 1 | 0.5 |
| EVERY 4TH FRAME | ~16KB | 521KB/s | 2 | 0.5 |
| EVERY 8TH FRAME | ~16KB | 521KB/s | 4 | 0.5 |
| EVERY 16TH FRAME | ~16KB | 521KB/s | 8 | 0.5 |
| EVERY 32TH FRAME | ~16KB | 521KB/s | 16 | 0.5 |
| EVERY 64TH FRAME | ~16KB | 521KB/s | 32 | 0.5 |

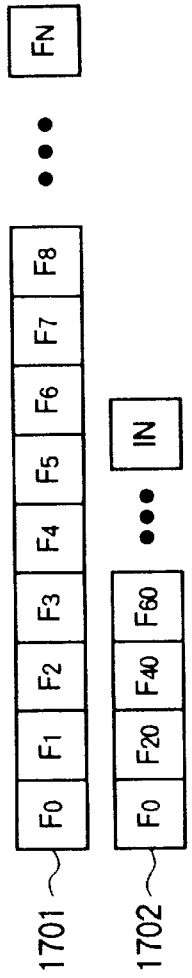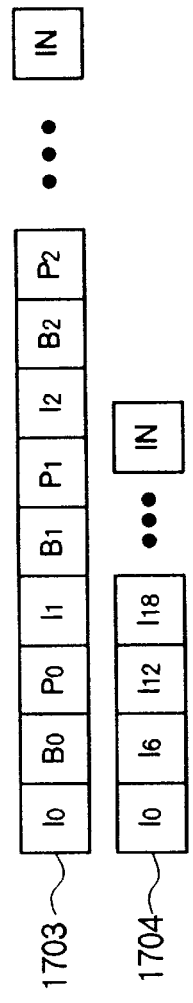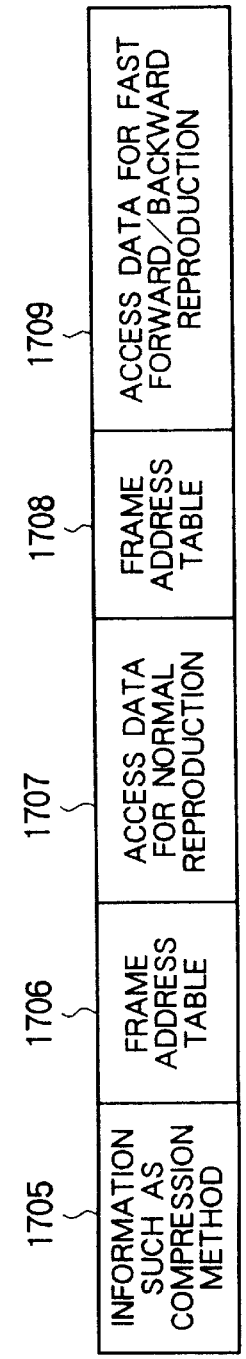

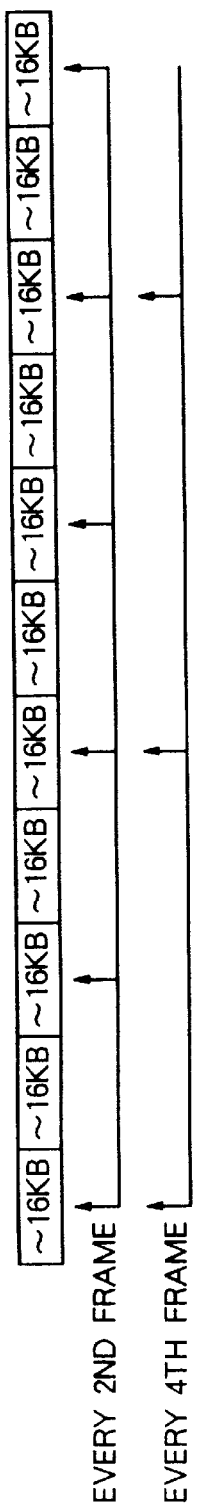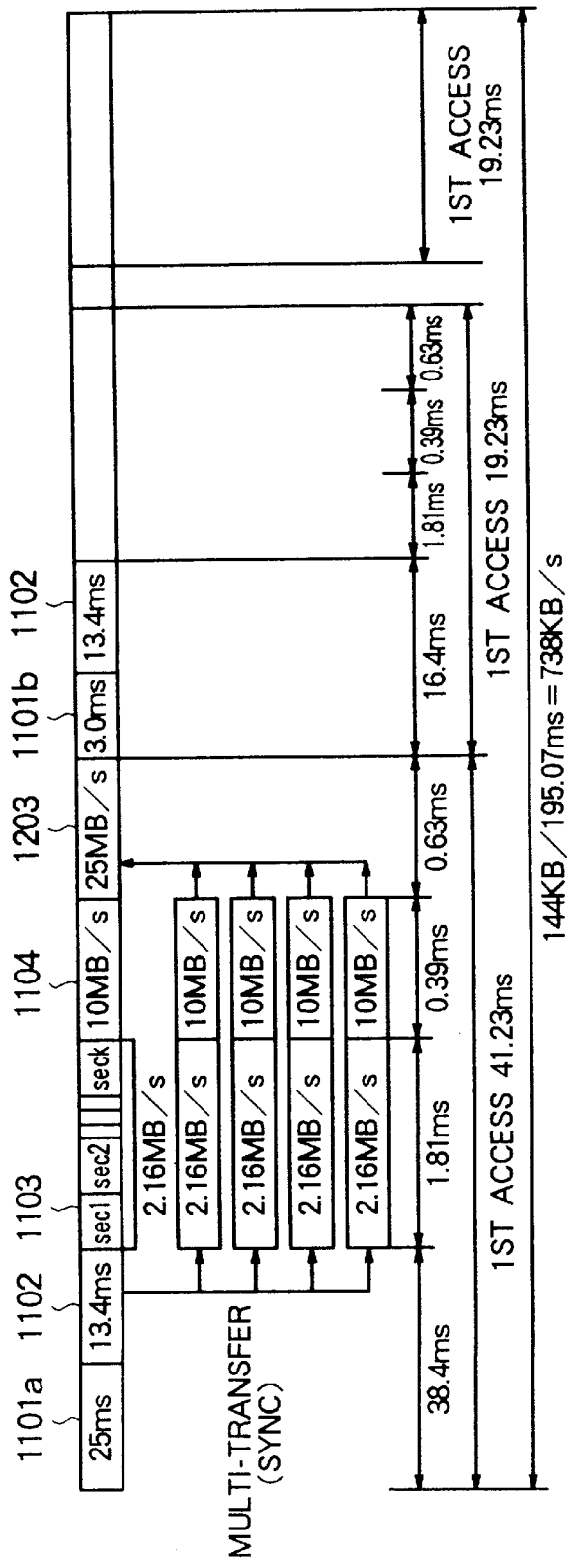
FIG. 18A
FIG. 18B

FIG. 18C

| ACCESS METHOD | ACCESS UNIT | THROUGHPUT | CLIENT SIDE | |
|---|---|---|---|---|
| | | | TIME PROGRESS RATIO (USER TIME SPEED) | FRAME RATE RATIO |
| NORMAL | 1024KB | 5114KB/s | 1 | 1 |
| EVERY 2ND FRAME | ~16KB | ~738KB/s | 0.29 | ~1/7 |
| EVERY 4TH FRAME | ~16KB | ~738KB/s | 0.57 | ~1/7 |
| EVERY 8TH FRAME | ~16KB | ~738KB/s | 1.14 | ~1/7 |
| EVERY 16TH FRAME | ~16KB | ~738KB/s | 2.29 | ~1/7 |
| EVERY 32TH FRAME | ~16KB | ~738KB/s | 4.57 | ~1/7 |
| EVERY 64TH FRAME | ~16KB | ~738KB/s | 9.14 | ~1/7 |

FIG. 20B

| TIME | STORAGE DEVICE HAVING LARGE CAPACITY AND LOW-SPEED RESPONSE 123 | STORAGE DEVICE HAVING HIGH-SPEED RESPONSE 121 | CLIENT 172 |
|---|---|---|---|
| T1 | $D1+D2+D3+D4+\cdots+Dk+\cdots+DN$ | | |
| T2 | $D1+D2+D3+D4+\cdots+Dk+\cdots+DN$ | $\xrightarrow{\text{WRITE}}$ D1 | |
| T3 | $D1+D2+D3+D4+\cdots+Dk+\cdots+DN$ | $\xrightarrow{\text{WRITE}}$ D1+D2 | D1 $\xrightarrow{\text{READ}}$ |
| T4 | $D1+D2+D3+D4+\cdots+Dk+\cdots+DN$ | $\xrightarrow{\text{WRITE}}$ D2+D3 | D2 $\xrightarrow{\text{READ}}$ |
| ・・ | | ・・ | ・・ |
| Tk | $D1+D2+D3+D4+\cdots+Dk+\cdots+DN$ | $\xrightarrow{\text{WRITE}}$ Dk-2+Dk-3 | Dk-1 $\xrightarrow{\text{READ}}$ |
| ・・ | | ・・ | ・・ |
| TN+1 | $D1+D2+D3+D4+\cdots+Dk+\cdots+DN$ | $\xrightarrow{\text{WRITE}}$ DN+DN | DN-1 $\xrightarrow{\text{READ}}$ |
| TN+1 | $D1+D2+D3+D4+\cdots+Dk+\cdots+DN$ | DN | DN $\xrightarrow{\text{READ}}$ |

▨ : DATA READ

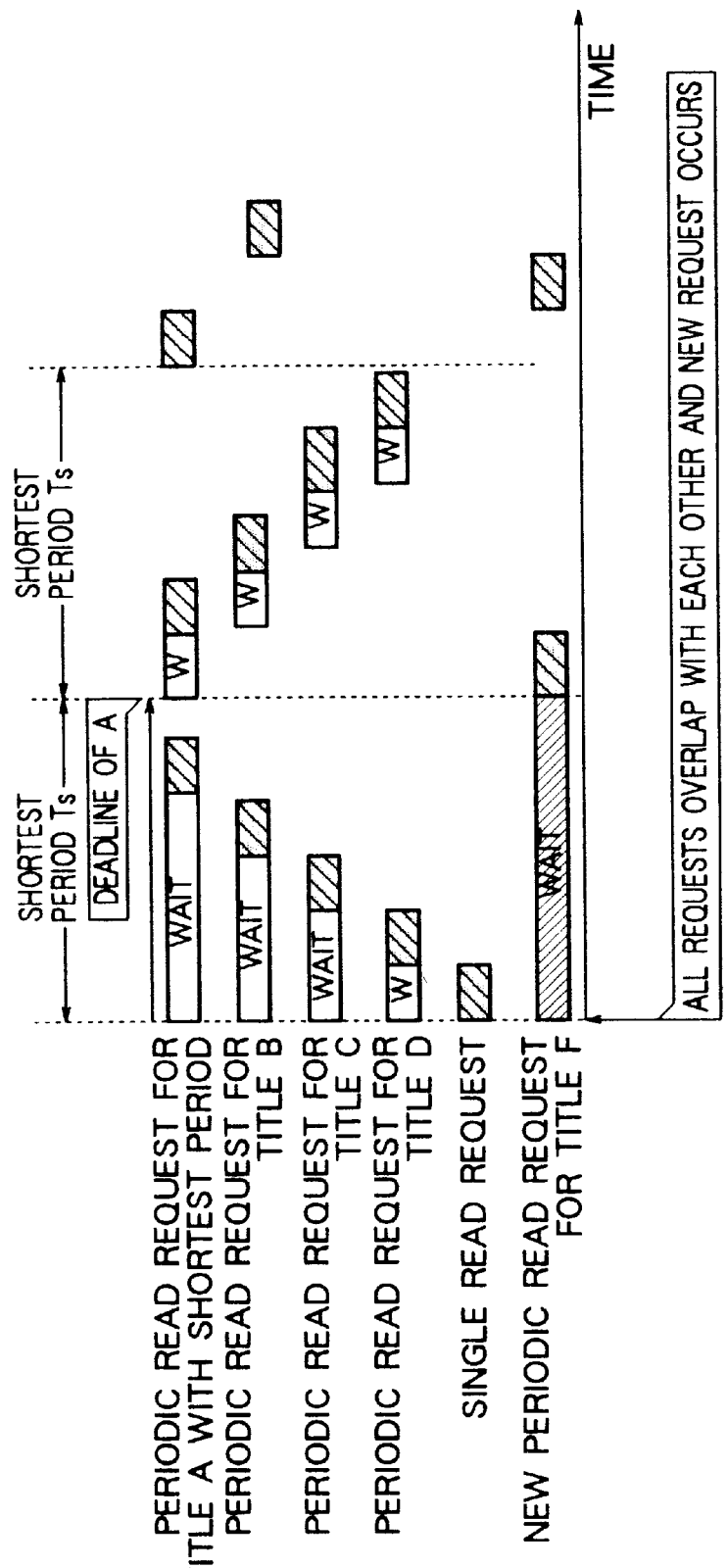

VIDEO STORAGE AND DELIVERY APPARATUS AND SYSTEM

BACKGROUND OF THE INVENTION

1. Field of the Invention

The present invention relates to a video storage and delivery apparatus and a video storage and delivery system, which are particularly suitable for supplying video data to a plurality of clients at the same time.

2. Description of the Related Art

FIG. 26A shows a conventional example of an information processing apparatus. The apparatus includes a central processing unit (CPU) 2610, a memory 2620, and input/output (I/O) units 2670. The CPU 2610 is connected to the memory 2620 by a system bus 2601. There is additionally provided an I/O bus 2602 to be linked with the system bus 2601 via a bus interface (I/F) 2603. Moreover, the information processing apparatus is coupled with, for example, a data storage device 2660 and/or a network 2650 via the output units 2670 disposed in I/O control blocks 2640 and 2641, respectively.

FIG. 26B shows another example of the information processing apparatus. This apparatus is configured in a similar manner as for the apparatus shown in FIG. 26A. In this construction, however, a plurality of CPUs 2610 and a plurality of I/O units 2670 are connected to the system bus 2670 to concurrently operate the plural cPUs 2610 for an improved processing performance (in a tightly coupled multiprocessor configuration).

In addition, an information processing system is configured by interconnecting a plurality of workstations (WSs) and/or personal computers (PCs) to each other via a local area network (LAN). For the network, there can be used, for example, the Ethernet having a throughput of approximately eight megabits per second (Mbps) and the fiber distributed data interface (FDDI) having a throughput of approximately 100 Mbps.

Recently, the asynchronous transfer mode (ATM) has been put to use for the LAN. The ATM-LAN differs from the communication method of the Ethernet and FDDI in which a communication line is used in a timesharing fashion. Namely, according to the ATM-LAN, a plurality of communication channels can be established through an ATM switch, which improves the throughput of the overall communication system. Each information processing apparatus has an interface provided with a plurality of hierarchically arranged throughput levels including, for example, approximately 50 Mbps, 150 Mbps, and 600 Mbps, respectively. Data items at lower-levels are collected by the multiplexer to be connected to a higher hierarchic level.

According to an increase in the transmission speed of communication lines, there arises a need for communication of a large volume of video data via a network. Using video data, it is possible to supply the users with various kinds of information items, which cannot be transferred by text data. Furthermore, to decrease the memory capacity and transmission bands, there are available such data compression functions as "JPEG", "MPEG", and "H.261".

An attempt has been made to develop a software system in which compressed video data (approximately 1.2 Mbps) is simultaneously delivered via the Ethernet to a plurality of clients, namely, about 20 clients terminals. As a data storage apparatus to store therein a large amount of data, there has been devised a redundant array of inexpensive disks (RAID). In this apparatus, a plurality of disk devices are connected to each other in a parallel manner for simultaneous operations thereof such that data items are stored on the respective disks in a striping fashion so as to improve the data access throughput. Moreover, information items such as parity bits are stored beforehand on redundant disks such that even when there appears a defective data block, it is possible to restore the correct original data.

There has been also implemented a data storage apparatus called an optical disk jukebox having a large capacity. The apparatus includes a plurality of optical disks such that an arbitrary optical disk can be selected for data output operation.

To supply time-series video data items to a plurality of users at the same time or in a concurrent fashion, there are required a large-capacity data storage apparatus capable of achieving reading and writing operations at a high speed and a network capable of transmitting data of a large capacity at a high transfer speed. When data storage apparatuses of this type are connected to each other via a conventional bus, there occurs a problem of data concentration of the bus.

In addition, video data is different from ordinary text data to be treated by the information processing apparatus. Namely, the video data is required to be controlled with respect to a time axis. In other words, it is necessary to guarantee quality of service (QOS) by constantly supplying each user terminal with video data having a quantity (per second) associated with the terminal so that an appropriate image is obtained by a display thereof.

To conduct delivery service of video data, when the information processing system has a configuration including the conventional bus, that is, when the plural file devices to store therein video data items (or a plurality of video storage and delivery apparatuses respectively having video file devices) are connected via a bus to a network, there occurs conflict between request issued from a plurality of units for the right to use the bus. As a result, a unit granted the right is given the right to transmit video data, which consequently makes is possible to guarantee the quality of service.

SUMMARY OF THE INVENTION

It is therefore an object of the present invention to provide a video storage and delivery apparatus and a video storage and delivery system in which video data or image data can be concurrently delivered to a plurality of users while guaranteeing the quality of service.

Another object of the present invention is to provide a video storage and delivery apparatus and a video storage and delivery system capable of transmitting responses to various video delivery requests from user terminals such as a request of fast forward reproduction or playback of pictures and a fast backward reproduction of pictures.

Still another object of the present invention is to provide a video storage and delivery apparatus and a video storage and delivery system capable of conducting a delivery service in which a picture of an arbitrary frame can be delivered to the user and/or pictures can be delivered thereto beginning at a specified point of time.

To achieve the above objects, the video storage and delivery system according to the present invention includes a plurality of input terminals, a plurality of output terminals, a switch unit for delivering input data to a specified output terminal, a control unit for controlling the switch unit, at least a video storage and delivery apparatus which is connected to the switch unit and which includes file means for storing therein respective video information items and output means for outputting video data, and a plurality of terminals coupled directly or via a network to the switch unit. Video data transfer between the video storage and delivery apparatus and the terminals and communications between the terminals and the control unit are carried out via the switch unit.

More specifically, the control unit includes means for storing therein information of a storage location of video data in the video storage and delivery apparatus. When a terminal issues to the control unit a request to access desired video data, the control unit controls the switch unit to establish a path to transfer video data between the video storage and delivery apparatus having the video data as the access object and the request source terminal. Moreover, the control unit has a function to accept from each user (terminal) a video delivery request containing a specified point of time at which data delivery is to be started so as to start a delivery service of the pertinent data thereto at the specified time.

According to another aspect of the present invention, the video storage and delivery apparatus according to the present invention includes at least a unit of file means for storing therein a frame address table containing storage address of each frame of video data together with the video data.

By virtue of the provision described above, when there is received, for example, a request of a fast forward or backward reproduction, the frame address table is used to read frame data necessary for the reproduction from the file means. Thus, to cope with the above request, the frame address table need only include a first frame address table containing a storage address in the file means of each frame of first video data to be reproduced at a first reproduction speed and a second frame address table containing a storage address in the file means of each frame of second video data to be reproduced at a second reproduction speed.

According to further another aspect of the present invention, the video storage and delivery apparatus of the present invention includes first and second data storage devices for storing data therein. At least a portion of video data specified by the delivery request is read from the first data storage device to be written in the second data storage device such that video data read from the second data storage device is delivered to the request source terminal. In this case, a storage device having a large data storage capacity such as an optical disk storage may be used as the first data storage device, whereas a storage device having a high response speed, for example, a magnetic disk device or a semiconductor storage may be adopted as the second data storage device.

According to still another aspect of the present invention, the video storage and delivery apparatus of the present invention includes an storage device for storing therein pictures and delivery control means for delivering a plurality of video or picture streams read from the storage device to a request source terminal via a network. When a new request is issued to deliver a video stream (or when a non-periodic access request is issued), an operation to accept the access request and timing information to execute the request are controlled according to a period of occupation time in which the storage device is occupied or busy due to video streams already in delivery and an access cycle of the storage device.

The new delivery request of a video stream is rejected or temporarily reserved, for example, according to whether or not an expression of condition $Ts \leq (W+Wk)$ is satisfied. In the expression, Ts stands for the minimum cycle time Ts of the access cycle time to the storage device according to the requests already in delivery or the requests already accepted, W indicates the total of values of access occupation time to the storage device related to the video streams in delivery, and Wk denotes a period of access time to the storage device due to the new video stream delivery request.

According to another aspect of the present invention, the video delivery system of the present invention includes switch means connected to a network or terminals, a controller connected to the switch means, and a plurality of video storage and delivery apparatuses connected to the switch means. Each of the video storage and delivery apparatuses includes at least one unit of storage means for storing therein respective video data items and delivery control means for delivering a plurality of video or picture streams read from the storage device to a request source terminal via the switch means. The controller copies at least a portion of video data under a delivery service from one of the video storage and delivery apparatuses onto another one of the video storage and delivery apparatuses so that the delivery service is conducted to a plurality of delivery request sources related to the same image by the plurality video storage and delivery apparatuses.

According to the present invention, a plurality of video storage and delivery apparatuses are connected via a switch unit to clients (various terminals) and a network, thereby removing the problems of the bottleneck on the bus and remarkably improving the system throughput. Using the switch unit and controlling the switch unit by a control unit, a priority control operation can be achieved for the video storage and delivery apparatuses, a control operation can be conducted to change the transfer rate for a plurality of video delivery channels, and the quality of service can be guaranteed for the data delivery channels in delivery even when a new data read request is issued.

The frame data address table of video data is stored in the data storage device together with the video data. Consequently, even when images requested by the user are to be reproduced according to a specified frame or beginning at a specified period of time, the frame address table read from the storage device is loaded on a high-speed memory such as a semiconductor memory to determine a storage location of the objective data according to the memory, thereby implementing a high-speed response. Referencing the frame address table in the high-speed memory, a storage address of data to be subsequently read from the data storage device can be obtained at a high speed during delivery of video data. Consequently, the objective data can be read from the data storage device at a high speed, thereby coping with the control of the quality of service for video data and special reproduction request such as the fast forward or backward reproduction.

To accumulate video data, there may be provided a second data storage device having a high-speed response in addition to the first data storage device. Using the second data storage device as a cache memory, when delivering video data from the second data storage device, subsequent video data or other video data to be delivered to another user is read from the first data storage device to be transferred to the second data storage device. Accordingly, video data accumulated in an identical file (first data storage device) can be concurrently delivered to a plurality of users.

BRIEF DESCRIPTION OF THE DRAWINGS

These and other objects and advantages of the present invention will become apparent by reference to the following description and accompanying drawings wherein:

FIG. 7 is a diagram showing a quality of service (QOS) control table 160 to control the switch bus 140;

FIGS. 16A to 16C are diagrams showing an example of the access method and specifications for a special data reproduction;

FIGS. 17A to 17C are diagrams showing an example of the video data storage format for a special data production;

FIGS. 18A to 18C are diagrams showing an example of the access method and specifications for a special data reproduction when RAID3 is employed as the data storage device;

FIGS. 20A and 20B are diagrams showing a data flow and operations when video data is stored in a cache memory according to the present invention;

FIGS. 33A to 33B are timing charts showing an example of a scheduling procedure for magnetic disks according to the present invention;

DESCRIPTION OF THE PREFERRED EMBODIMENTS

Figure 1:
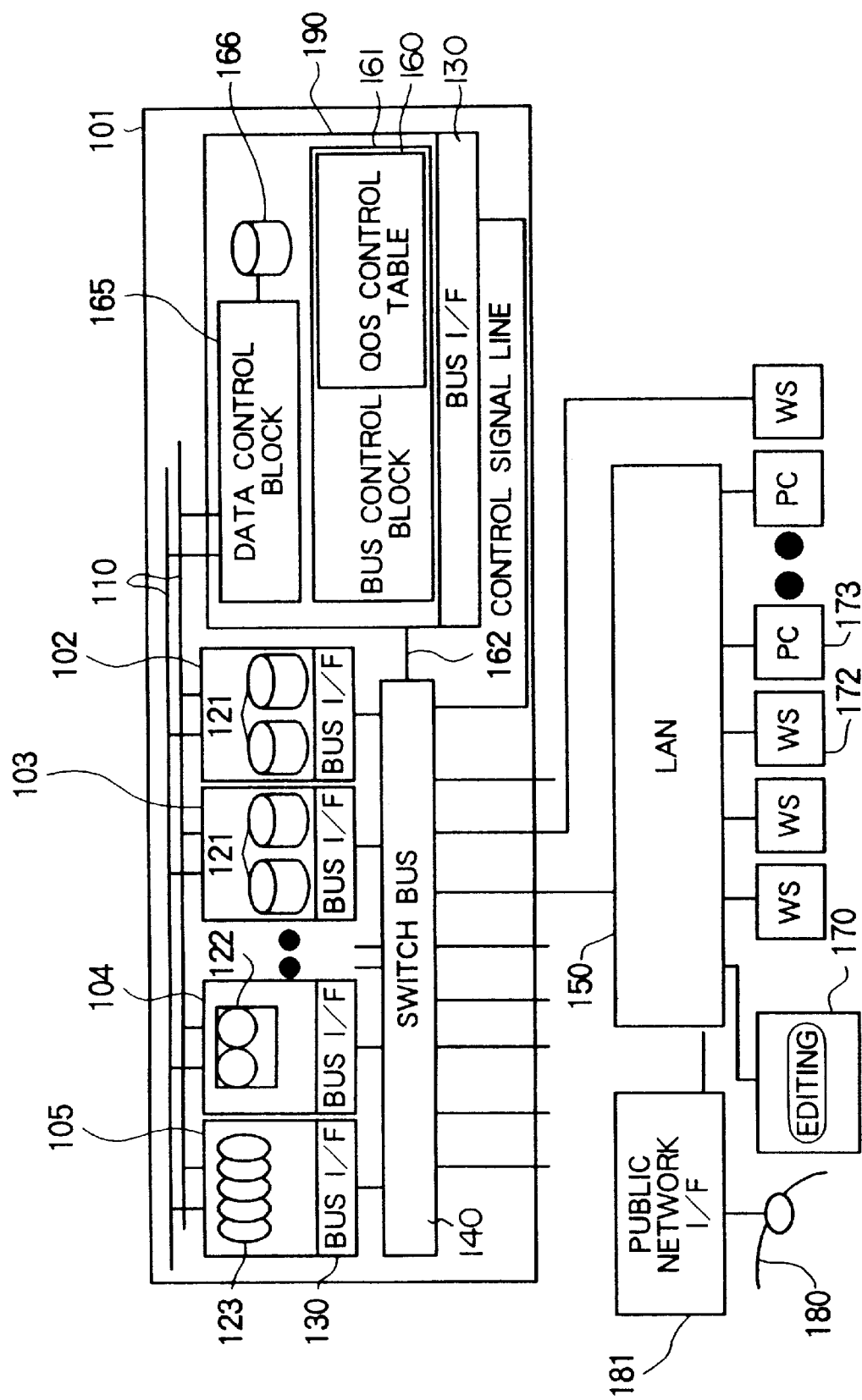
FIG. 1 is a diagram schematically showing the configuration of an embodiment of the video storage and delivery system according to the present invention.

FIG. 1 shows the structure of a video storage and delivery system according to the present invention and clients connected thereto. A reference numeral 101 indicates a video storage and delivery system, numerals 102 to 105 denote video storage and delivery apparatuses, a numeral 121 denotes a magnetic disk device, a numeral 122 indicates a magnetic tape device, and a numeral 123 denotes an optical disk jukebox. A numeral 140 indicates a switch bus, a numeral 130 denotes a bus interface (I/F), a numeral 190 designates a control unit, a numeral 160 indicates a quality-of-service (QOS) control table, a numeral 161 is a bus control block, a numeral 162 indicates a control signal line for controlling the switch bus 140, and a numeral 165 denotes a data control block. The block 165 controls the apparatuses 102 to 105 according to data which is stored in control information storage means 166 and which indicates correspondences between the apparatuses 102 to 105 and data items stored therein. A numeral 110 denotes a resource control signal line. A numeral 172 denotes a workstation (WS), a numeral 173 designates a personal computer, a numeral 170 indicates an editing workstation (WS), a numeral 150 denotes a local area network (LAN), a numeral 180 is a leased or public network, and a numeral 181 denotes an interface for the network 180.

In the system 101, a plurality of apparatuses 102 to 105 are mutually connected to each other by the switch bus 140. The control unit 190 supervising the overall operation is also linked with the switch bus 140. Each of the apparatuses 102 to 105 is controlled by the control unit 190 connected thereto via the resource control signal line 110. The control unit 190 is coupled with the switch bus 140 via the control signal line 162. The apparatuses 102 to 105 receive, as inputs thereto, instructions from the control unit 190.

The switch bus 140 is connected to the various video data storage apparatuses 121 to 123, the workstation 172, the personal computer 173, and th e local area network 150.

Consequently, the video storage and delivery system 101 can achieve data communications via the switch bus 140 between the video storage and delivery apparatuses 102 to 105, between the apparatuses 102 to 105 and the control unit 190, between the apparatuses 102 to 105 and the clients, between the control unit 190 and clients, and between clients.

The bus control block 161 of the control unit 190 references the QOS control table 160 storing therein information of connections between the apparatuses 102 to 105 and output terminals of the switch bus 140 to control the switch bus 140 via the control signal 162, thereby setting and altering connections between the constituent elements above and establishing priority for communication. The control table 160 will be described in detail later by reference to FIG. 7. This system 101 can be connected via the interface 181 to the public network 180.

Figure 2:
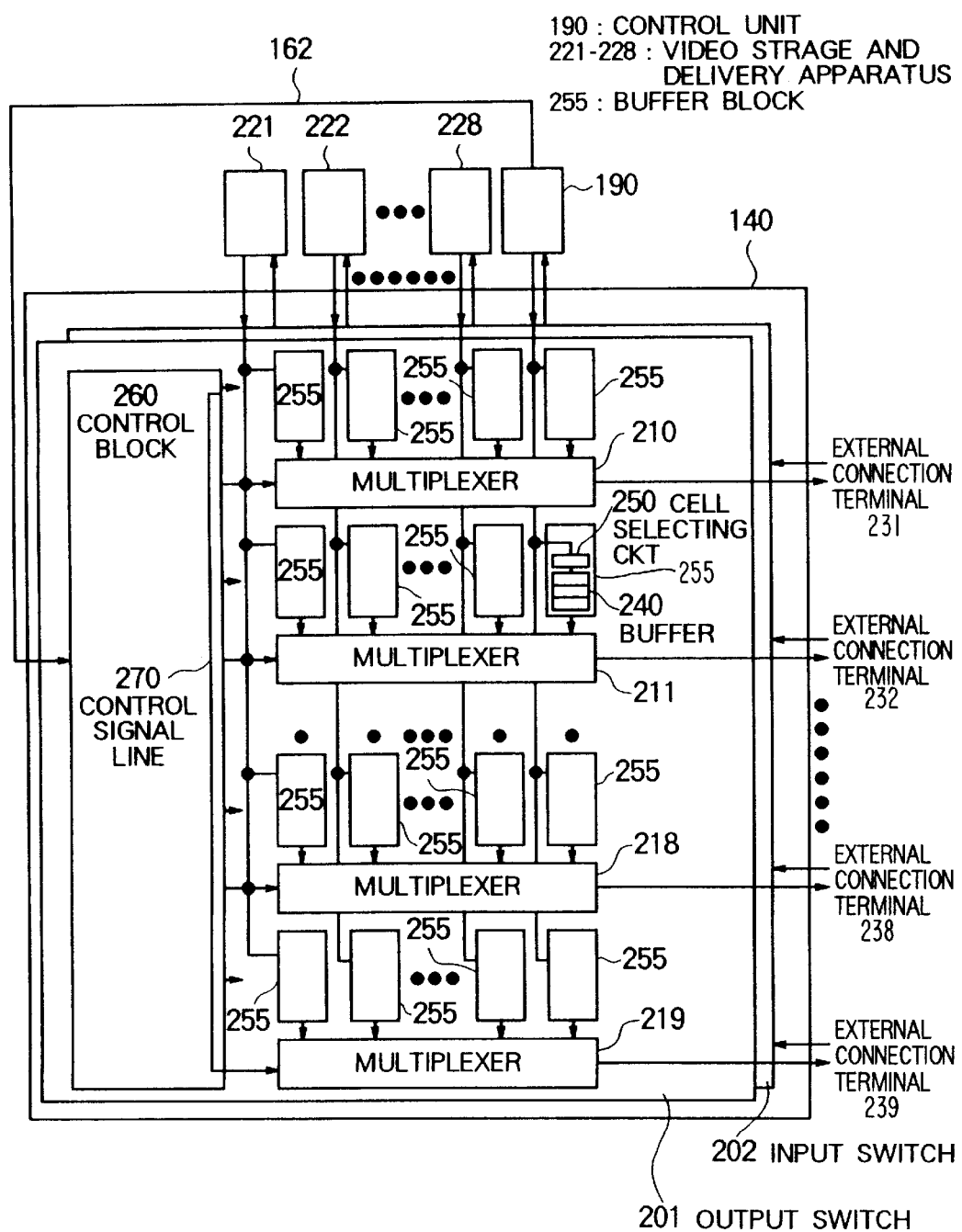
FIG. 2 is a diagram showing the construction of a switch bus of FIG. 1.

FIG. 2 shows an example of constitution of the switch bus 140. Reference numerals 221 to 228 indicate video storage and delivery apparatuses 102 to 105 of FIG. 1. The control unit 190 of FIG. 1 is connected in the similar manner as for the video storage and delivery apparatuses 102 to 105. Numerals 231, 232, 238 and 239 denote external connection terminals or ends to be connected to the LAN 150, a numeral 255 denotes a buffer block, a number 250 designates a cell selecting circuit 250, a numeral 240 indicates a buffer, and numerals 210 to 219 denote multiplexers. A numeral 260 denotes a control block to control the cell selector 250 in each buffer block 255 via a control signal line 270. Thanks to an input switch 202 and an output switch 201, there can be achieved bi-directional communications.

The switch bus 140 transfers information in the cell unit.

Figure 3:
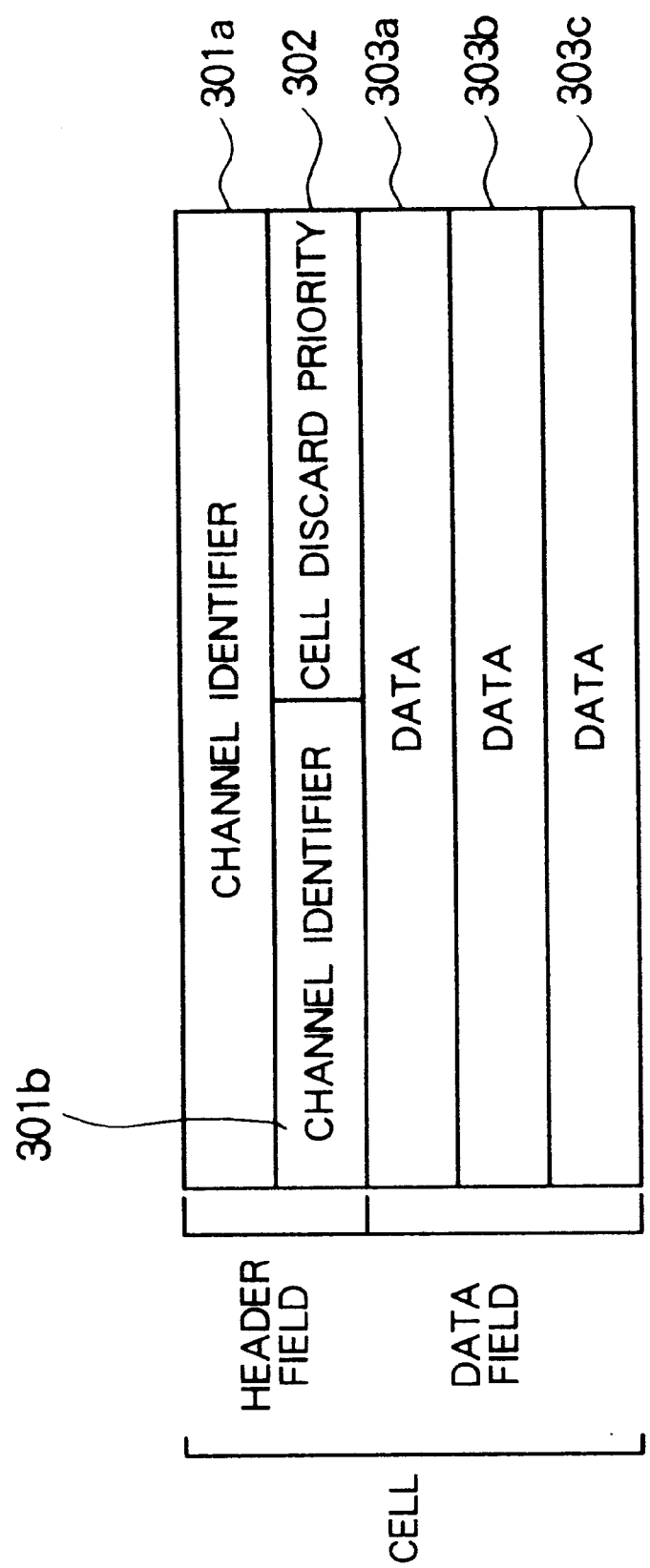
FIG. 3 is a diagram showing the structure of cells transferred via the switch bus 140.

FIG. 3 shows the structure of each cell. Received data is subdivided into cells by the bus interface 130. In the interface 130, a header field is added to each cell. Written in the header field is a connection number. The header field includes channel identifiers 301a and 301b, cell discard priority 302, and a data field including a plurality of data items 303a to 303c. The channel identifier 301 is an index decided by the source and the destination of the data.

Returning to FIG. 2, when establishing a connection in the switch bus 140, information of connections indicating correspondences between the units 221 to 228 of FIG. 2 and the external connection terminals 231 to 239 is added to a cell transfer table. In a data transfer, the table is checked according to the channel identifier 301 of the data to determine a destination thereof. Each cell selecting circuit 250 is controlled by the control signal line 270. The cell selecting circuit 250 selects only the cells related to the decided destination and forms a queue of the cells in the buffer 240 to sequentially deliver the cells to the multiplexer 211 so as to output the cells to the external connection terminals 231 to 239. When the buffer 240 becomes full of data and it is necessary to discard a cell, the cell selecting circuit 250 decides the discard cell according to the cell discard priority 302 and under control of the control block 260.

Figure 4:
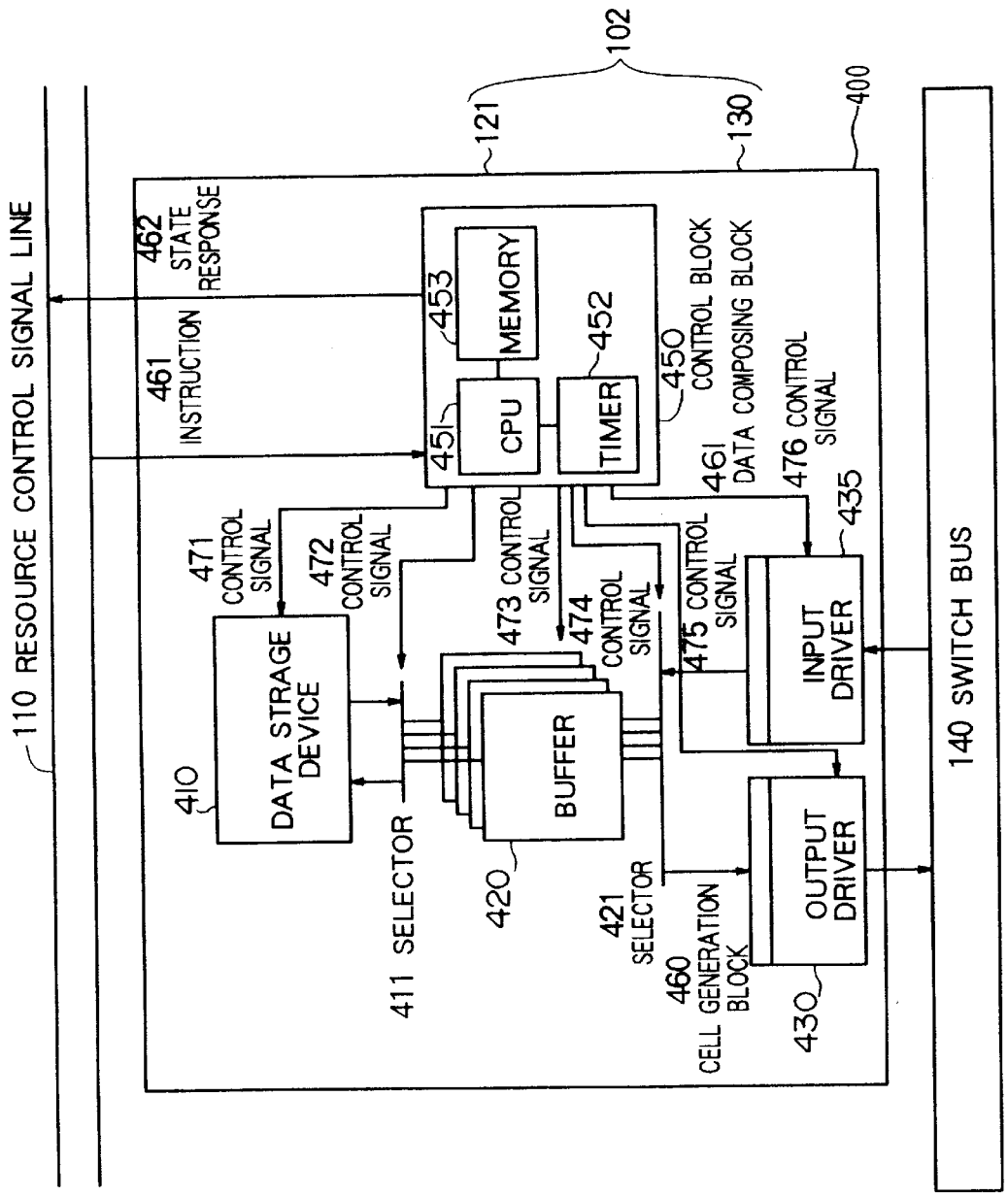
FIG. 4 is a diagram showing the basic configuration of each of the video storage and delivery apparatuses 400 used as apparatuses 102 to 105 in the system of FIG. 1 according to the present invention.

FIG. 4 shows an example of constitution of the video storage and delivery apparatus 102 in the video storage and delivery system 101 of FIG. 1. A reference numeral 400 denotes a video storage and delivery apparatus (corresponding to each of the apparatuses 102 to 105 of FIG. 1), a numeral 410 indicates a data storage device such as a magnetic disk, numerals 411 and 421 designate selectors, and a numeral 420 denotes a buffer. Numerals 430 and 435 respectively denote an output driver and an input driver and numerals 460 to 461 respectively indicate a cell generation block and a data composing block. A numeral 450 denotes a control block, a numeral 451 denotes a central processing unit (CPU), a numeral 452 designates a timer to control the time axis or sequence of video information, and a numeral 453 indicates a memory to store therein a state of each data storage device 410. As already described in conjunction with FIG. 1, a numeral 110 is a resource control signal line to communicate an instruction 461, a status, and a response 462 to request between the control block 450 and the control unit 190. Numerals 471 to 476 designate control signals.

In the apparatus 102, the data storage device 410 is controlled by an instruction received from the resource control signal line 110. For example, when a data read instruction is received, video data is read from the device 410 according to a point of time indicated by the timer 452. The obtained data is partitioned into cells by the cell generating block 460 in the bus interface 130 to be fed via the output driver 430 to the switch bus 140. When a new data read instruction is received during execution of the preceding data read instruction, if the new instruction is executable, a response 462 indicating the pertinent condition is transmitted via the signal line 110 to the control unit 190.

The selector 411 connects the device 410 to the buffer 420 when necessary. Similarly, the selector 421 establishes connections between the buffer 420, the cell generating block 460, and the data composing block 461. The buffer 420 is used, when necessary, as an input or output data buffer. For this purpose, a code indicating the pertinent control operation is loaded in the memory 453 beforehand.

On receiving a video data delivery instruction from the control unit 190 via the signal line 110, the video storage and delivery apparatus 102 checks the capacity of the video channels currently in the delivery operation and the resources of the apparatus 102 to decide whether or not the new instruction is to be executed. After acknowledgement for the instruction is notified to the control unit 190, the resource control of the apparatus 102 and the quality of service for the delivery data are achieved by the control block 450. The switch bus 140 is controlled by the control unit 190 of FIG. 1.

It may also be possible to store the delivery capacity of each video storage and delivery apparatus 400 beforehand such that the executability of the instruction is determined according to the number currently available delivery channels and transfer rates for the respective apparatuses 400.

Figure 5:
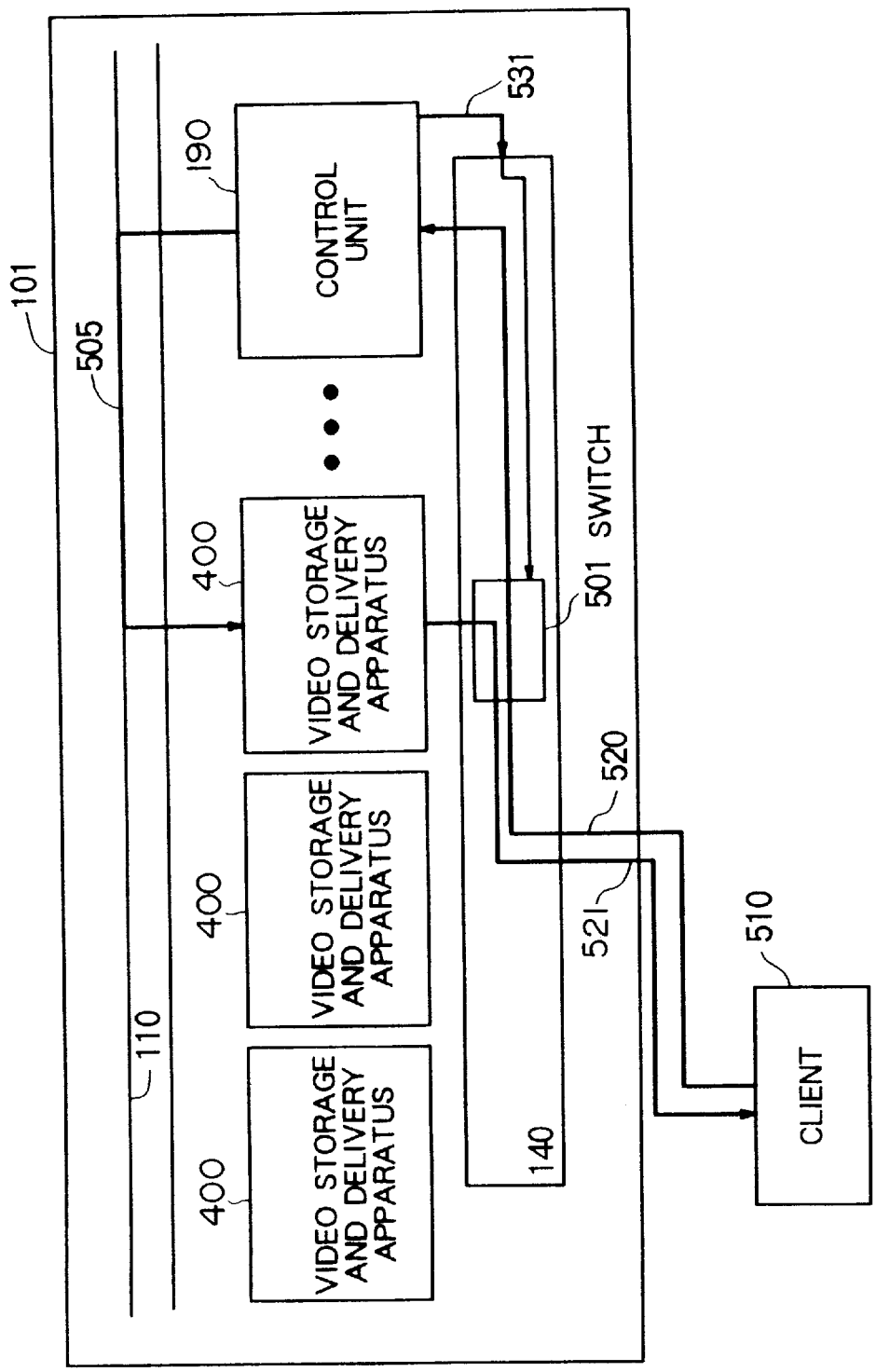
FIG. 5 is a diagram showing the operation to deliver video data in a video delivery system 101 of FIG. 1.

FIG. 5 schematically shows the data read operation in the system of FIG. 1. In this diagram, a numeral 400 denotes a video storage and delivery apparatus (corresponding to each of the apparatuses 102 to 105 of FIG. 1), a numeral 190 denotes a control unit, and a numeral 505 designates an instruction to be sent via the resource control signal line 110 to the apparatus 400. A numeral 501 is a switch on the switch bus 140, a numeral 510 indicates a client (corresponding to each of the units 170, 172, and 173 of FIG. 1), a numeral 520 denotes a request from a client to the video storage and delivery system 101, and a numeral 521 designates data.

When a client 510 issues a video data read request 520 to the system 101, the request is received by the control unit 190. The controller 190 then checks control information 166 shown in FIG. 1 to determine which one of the apparatuses 400 contains the requested video data. When the objective apparatus 400 is available for the data delivery, the control unit 190 establishes a connection between the apparatus 400 and the client 510 and controls the switch 501 on the switch bus 140, thereby transferring the video data from the apparatus 400 to the client 510.

According to the present invention, the plural video storage and delivery apparatuses 400 achieving storage and delivery of video data are connected in a parallel fashion to the switch bus 140. From the client side, an access request to the apparatuses 400 need only be issued to a single system, namely, the video storage and delivery system 101. The switch bus 140 is controlled by the control unit 190.

Figure 6:
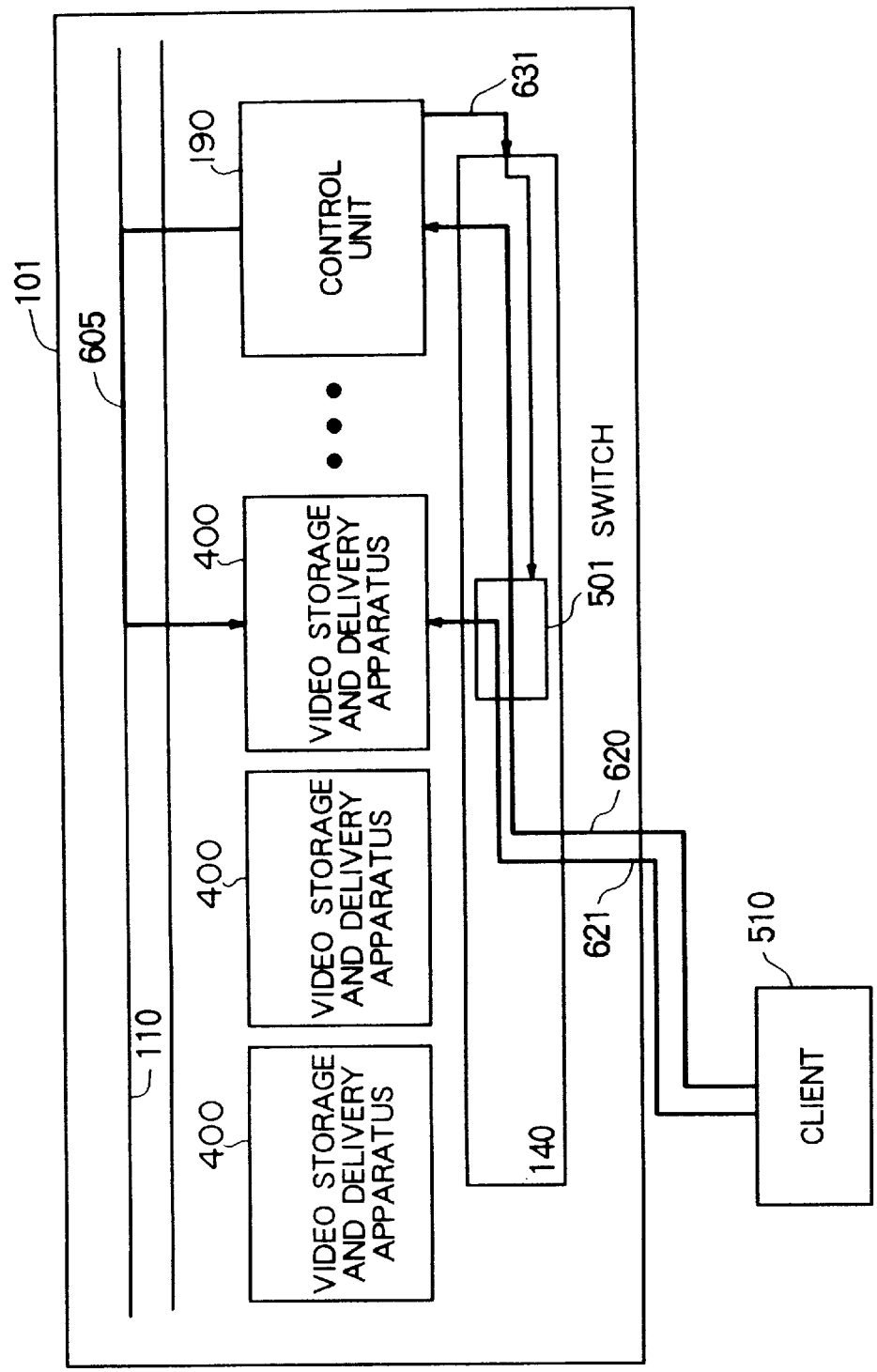
FIG. 6 is a diagram showing a write operation of video data in a video delivery system 101 of FIG. 1.

FIG. 6 shows a concept of the write operation of video data in the video storage and delivery apparatuses 102 to 105 (corresponding to the apparatuses 400 of FIG. 4) in the system of FIG. 1. A numeral 605 denotes a write instruction, a numeral 510 designates a client of a title creator such as a community-antenna-television (CATV) station, an advertisement agent, or a television camera, a numeral 620 indicates a write request from a client to the video storage and delivery system 101, and a numeral 621 is write data. The other constituent components and operations are the same as those of FIG. 5.

FIG. 7 is a QOS table in the control unit 190 of the system 101. The column of "connections" includes a sequential number. Each "source" field indicates a flag to identify an information sender or source among the clients 510 and/or the apparatuses 400. Each "destination" field contains a flag to identify an information receiver or destination therein. A "priority" field contains a value to identify that the pertinent data is realtime data (A) such as data of a television telephone or non-realtime data (B) such as data of electronic mail.

Figure 8:
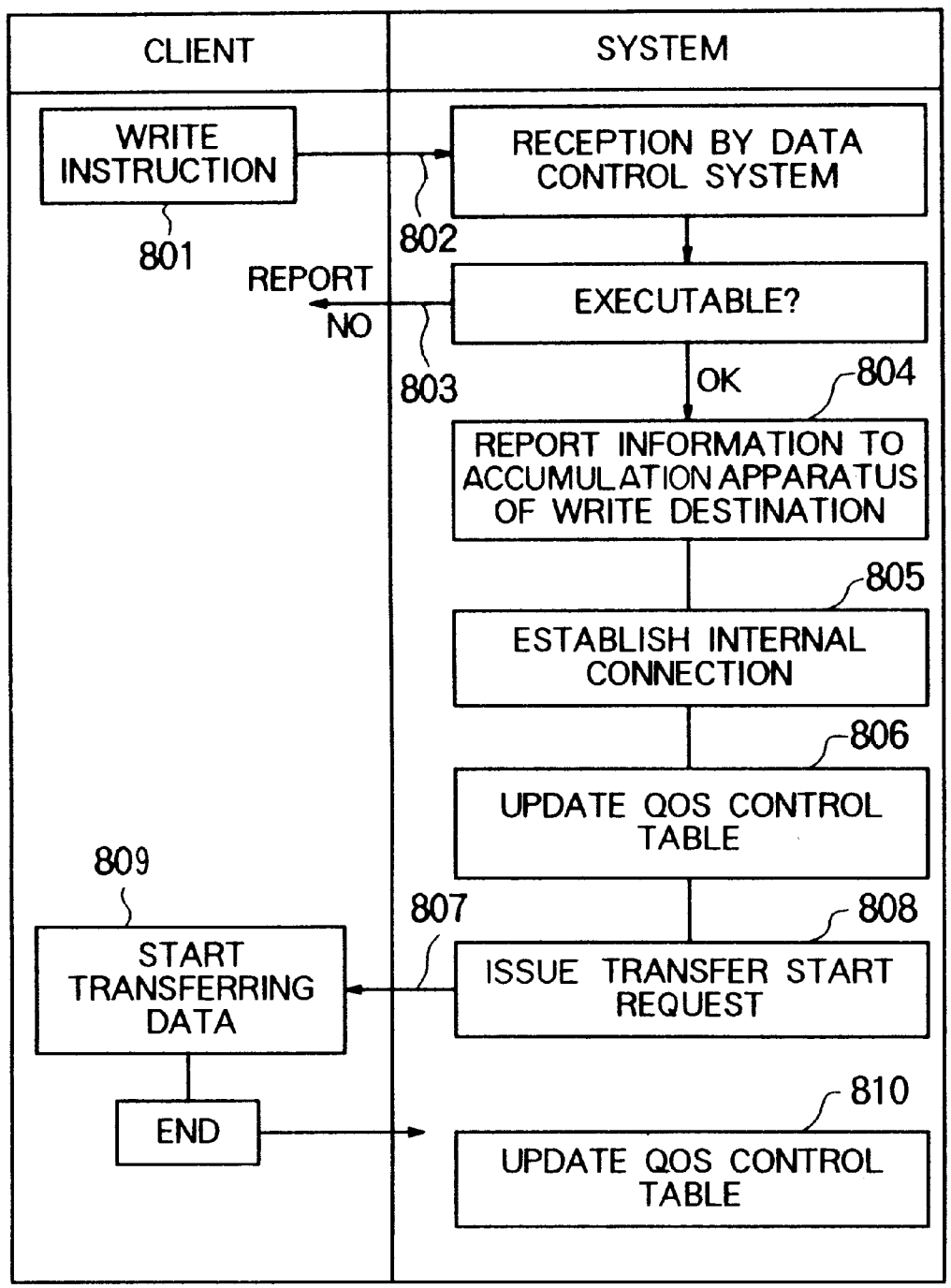
FIG. 8 is a flowchart showing operations between a client and a server in a video data write operation.

FIG. 8 shows operations of the configuration of FIG. 6 in which data from a client 510 is written in the system 101. First, a video data write instruction 801 is issued from the client 510 to notify information 802 including a data name, a quantity of data, and a transfer rate (throughput) to the system 101. In the system 101, data control information and the resource control signal line 110 are checked for states of the respective units 400 as to decide if an apparatus 400 is available for the write operation. If the write instruction cannot be executed, a response of rejection 803 is reported to the client 510. If the instruction is executable, information of the data source such as the address, the data quantity, and the transfer rate is notified via the signal line 110 to the write destination unit 400 (step 804). Subsequently, a connection is established by the switch bus 140 between the client 510 and the apparatus 400 in which the video data is to be stored (step 805). The control unit 190 examines the states of the apparatuses 400 according to the QOS control table 160 of FIG. 7 to determine availability thereof for the write operation or to select apparatuses 400 suitable for the write operation. The control unit 190 then updates the table 160 and establishes the connection (step 806).

On the server side, the apparatus 400 issues a transfer start request 807 to the client 510 (step 808). The client 510 initiates transferring video data (step 809) to write the video data in the objective apparatus 400. After the operation is terminated, the connection which is unnecessary at the pertinent point of time is discarded and the control table 160 is updated (step 810).

According to the present invention, the plural video storage and delivery apparatuses are distributively connected in a parallel fashion to the switch bus 140. Consequently, the storage capacity and/or the simultaneous video delivery performance necessary for the user or application can be easily obtained by changing the number of video storage and delivery apparatuses connected to the system.

Figure 9:
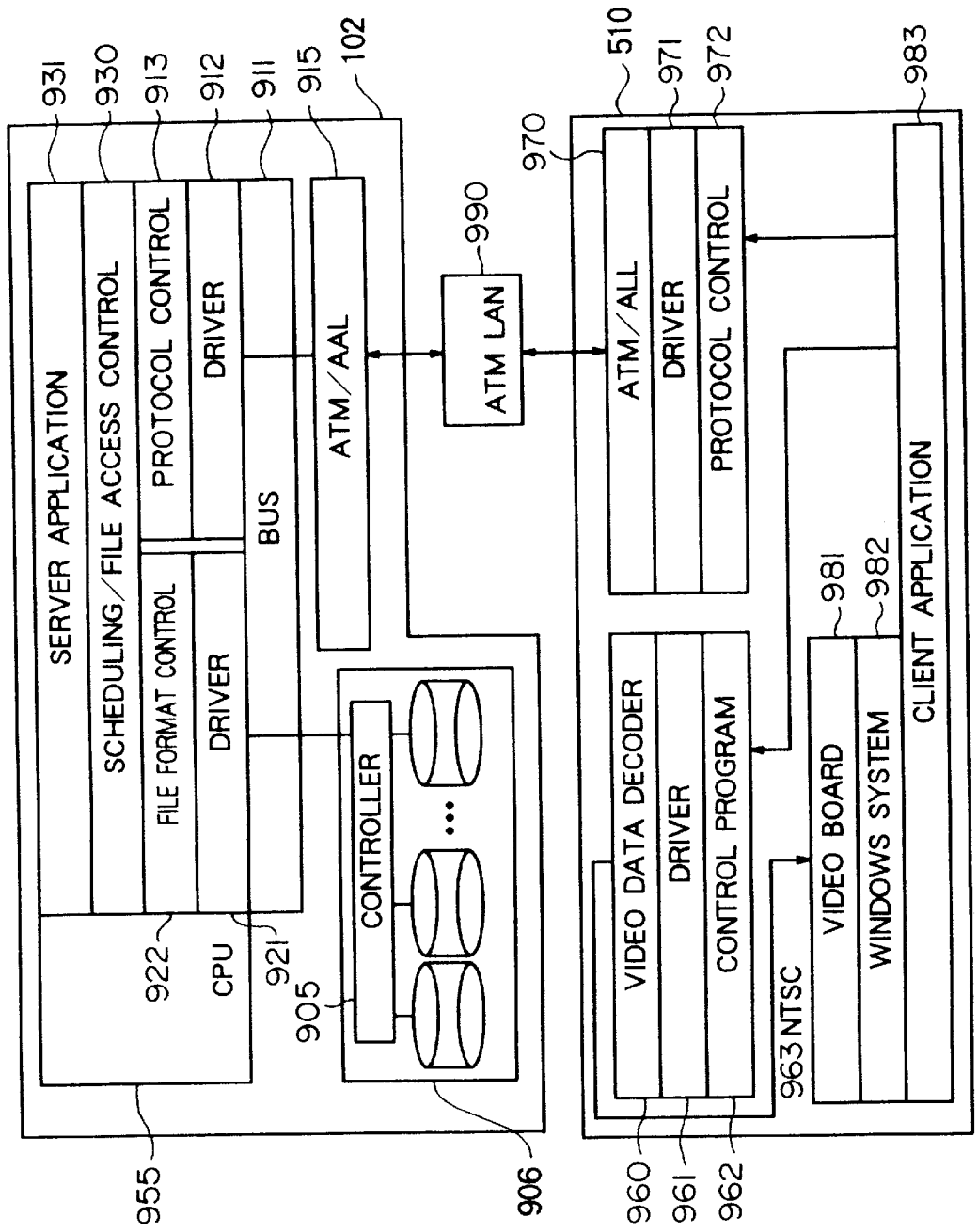
FIG. 9 is a diagram showing another example of the constitution of the video storage and delivery system according to the present invention.

FIG. 9 shows an example of the construction of the video storage and delivery apparatus 102 in which a numeral 906 indicates a disk array apparatus and a numeral 905 denotes a controller thereof. A numeral 995 denotes a CPU, a numeral 911 designates a bus, and numerals 912 and 921 indicate bus drivers. A numeral 913 denotes a protocol controller to conduct communications via a network, a numeral 922 designates a file storage format controller for the disk array apparatus 906, a numeral 930 indicates a scheduling and file access controller, a numeral 931 denotes a server application, a numeral 999 indicates an ATM-LAN, and a numeral 915 denotes an ATT/ATM adaptive layer (AAL).

A numeral 510 denotes a client (terminal equipment), a numeral 970 denotes an ATM/AAL, a numeral 971 indicates a driver, a numeral 972 designates a protocol controller, a numeral 960 denotes a video data decoder, and a numeral 961 indicates a driver. A numeral 962 denotes a decoder controller, a numeral 963 indicates a national-television-system-committees (NTSC) signal line, a numeral 981 designates a video board, a numeral 982 denotes a Windows system, and a numeral 983 indicates a client application. In the example of FIG. 9, the video storage and delivery apparatus 102 is directly connected to the ATM-LAN 990.

The file format controller 922 controls the storage format of data received from the disk array apparatus 906 via the driver 921 and supervises read and write operations thereof. The protocol controller 913 communicates data via the driver 912 with the ATM/AAL 915 in conformity with a network protocol prescribed between the protocol control blocks 913 and 972. The scheduling and file access controller 930 controls a time schedule for the disk array apparatus 906. The controller 930 issues a data access instruction to the file format controller 922 and the protocol controller 913 and then conducts scheduling for respective tasks.

A numeral 970 indicates an ATM/AAL to control separation of cells and information transfer methods, a numeral 971 denotes a driver, and a numeral 972 denotes a protocol controller. The video data decoder 960 decodes video data which is received via the ATM-LAN 990 and which is then assembled by the ATM/ALL 970 and the protocol controller 972 so as to transform the video data into a video signal, e.g., an NTSC signal 963. A numeral 961 designates a driver of the decoder 960. The decoder controller 962 controls the decoder 960. The NTSC signal 963 is input to the video board 981. The Windows system 982 displays the received video signal on a screen specified by the client application 983.

Figure 10:
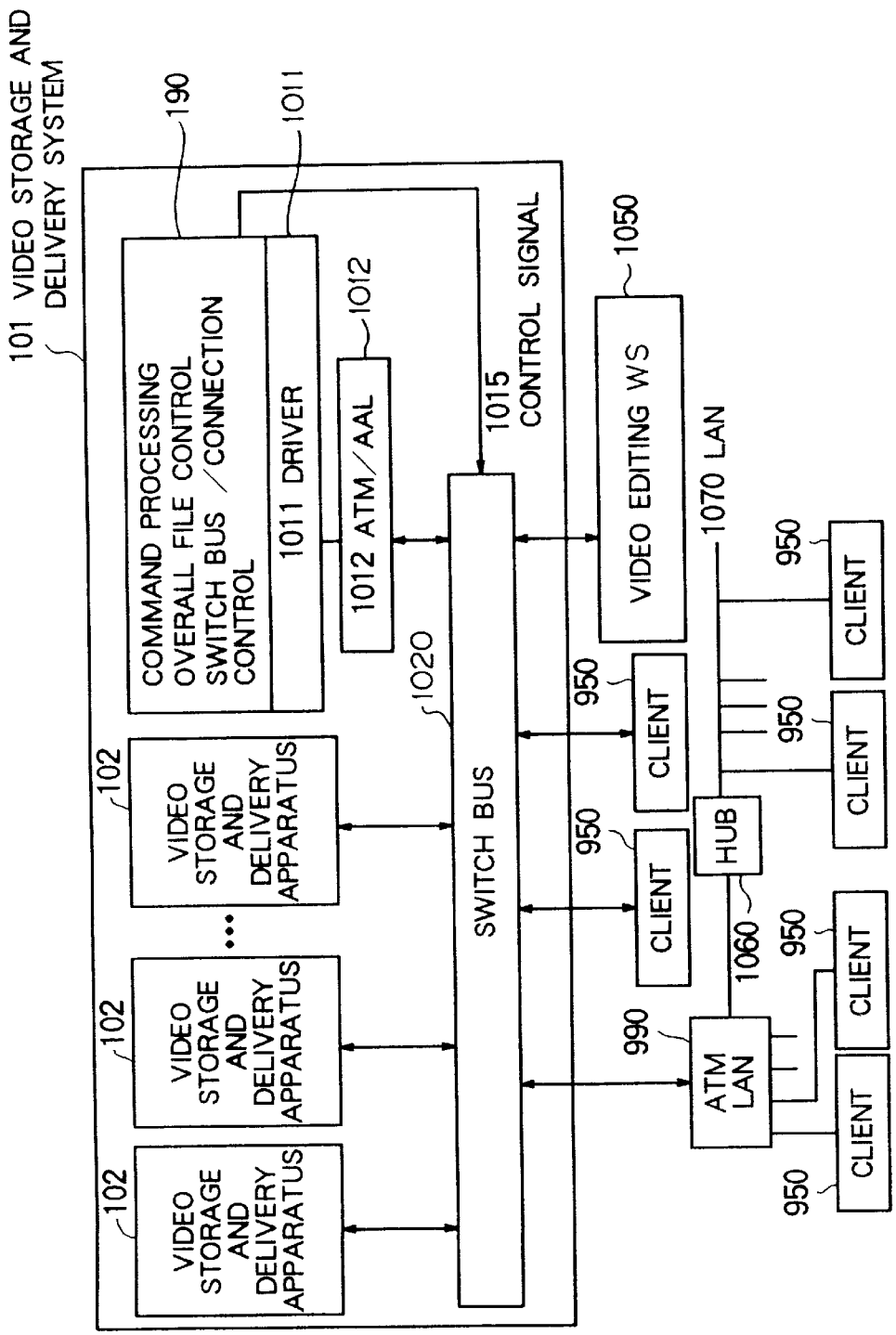
FIG. 10 is diagram showing another configuration of the video storage and delivery system to which the apparatus of FIG. 9 is applied according to the present invention.

FIG. 10 shows a video storage and delivery system 101 in which the video storage and delivery apparatuses 102 of FIG. 9 are connected in a parallel manner to the switch bus 1020.

A reference numeral 190 denotes a control unit, a numeral 1011 indicates a driver, and a numeral 1012 designates an ATM/AAL. A numeral 1020 denotes a switch bus and a numeral 1015 indicates a control signal line. A numeral 950 is a client, a numeral 990 designates an ATM-LAN, and a numeral 1060 denotes an HUB to establish connections of a one-to-plural correspondence, and a numeral 1070 indicates an LAN.

In the example of this system 101, ATM cells are transferred via the switch bus 1020. The control method and the functions of the respective constituent components are the same as those of the system shown in FIG. 1.

Each of the clients 950, the apparatuses 102, and the control unit 190 includes an ATM interface. When the LAN 1070 is implemented by a network other than the ATM network such as Ethernet, the HUB 1060 conducts conversion between the ATM cells and packets on the network. When each apparatus 102 includes an ATM interface, a client having the ATM interface can be connected to the ATM-LAN and the system 101.

Referring now to FIGS. 11A, 11B, 12A, 12B, 13 to 15, 16A to 16C, 17A to 17C, 18A to 18C, 19A, and 19B, description will be given in detail of the video storage and delivery apparatus 102 and the video storage and delivery system 101.

Figure 11A:
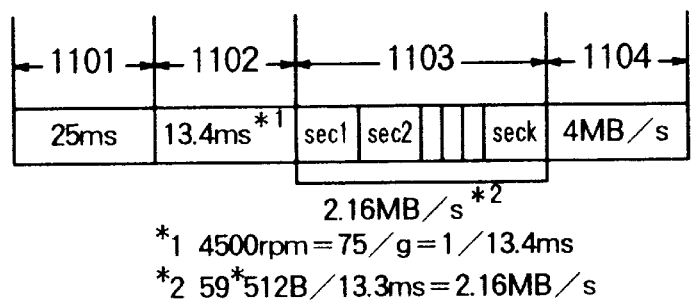
FIGS. 11A and 11B illustrate a graph showing a relationship between a period of time necessary for a data access and throughput per data access unit in a single magnetic disk device.

FIGS. 11A and 11s show throughput per access unit of the SCSI interface for a single magnetic disk device. Specifications of the disk device include a rotary speed of 4500 rounds per minute (rpm), a head seek time of 25 milliseconds (ms), and a latency of 13.4 ms. The disk format is specified as follows, namely, each sector includes 512 bytes and each track includes 59 sectors.

FIG. 11A shows a period of time required for a data read operation under a worst condition.

A data read operation on a magnetic disk is associated with an overhead time including a head seek time 1101 and a latency 1102. The head seek time 1101 is necessary to displace the read/write head to a position over a desired track, whereas the latency 1102 indicates a period of time which necessarily lapses from when the head is located over the objective track to when a desired sector passes a position below the head. A disk read time 1103 is necessary to transfer the data read from the disk to a buffer. A small-computer-system-interface (SCSI) transfer time 1104 is required to transfer the data from the buffer of the disk device to the destination via the SCSI or via a data transmission line place thereof. The disk read operation and the SCSI transfer can be executed according to a pipeline procedure in which the data items can be read at a higher speed as compared with the case shown in FIGS. 11A and 11B.

Figure 11B:
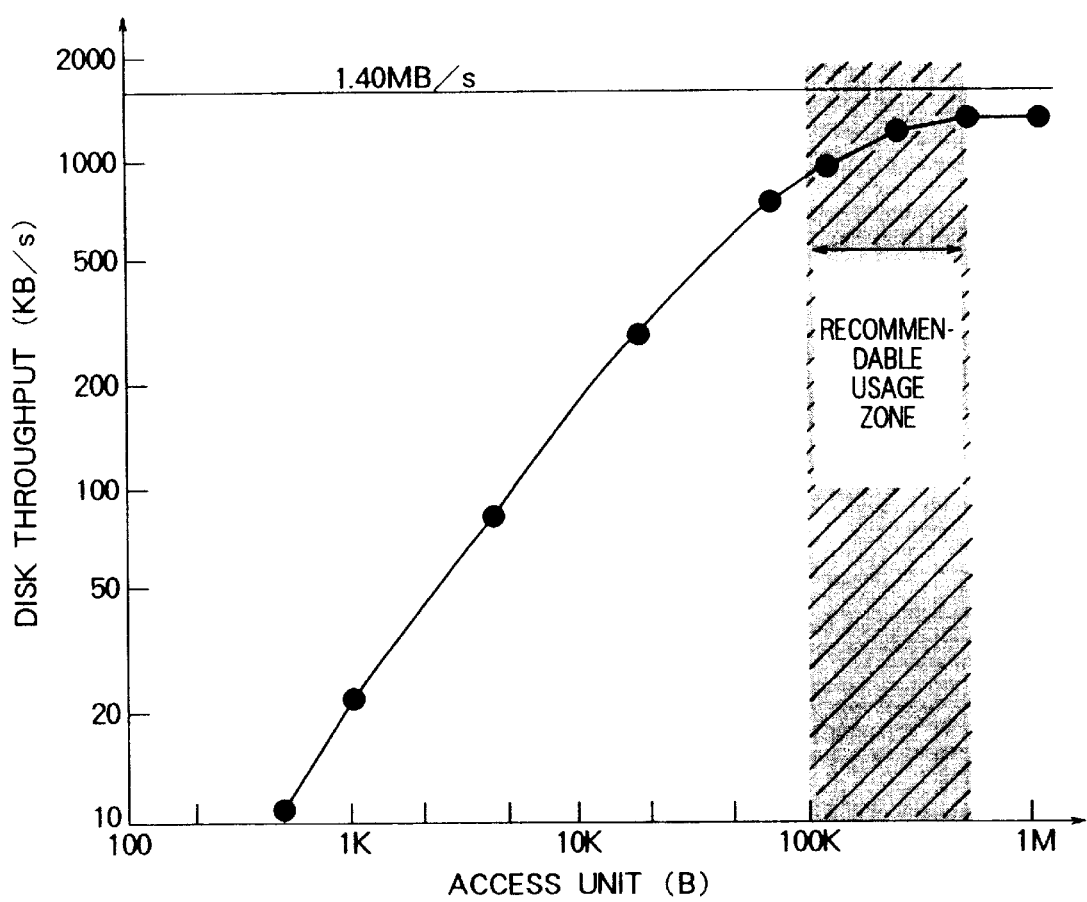

FIG. 11B is a graph of throughput of data read operations per data access unit for the disk device above. The greater the access unit is, the smaller the ratio of overhead is, which consequently improves the throughput. For efficient use of magnetic disks, the disk access is desirably conducted in the access unit shown in the shadow portion of FIG. 11B.

Next, description will be given of the access performance when the RAID3 is used as the data storage.

Figure 12A:
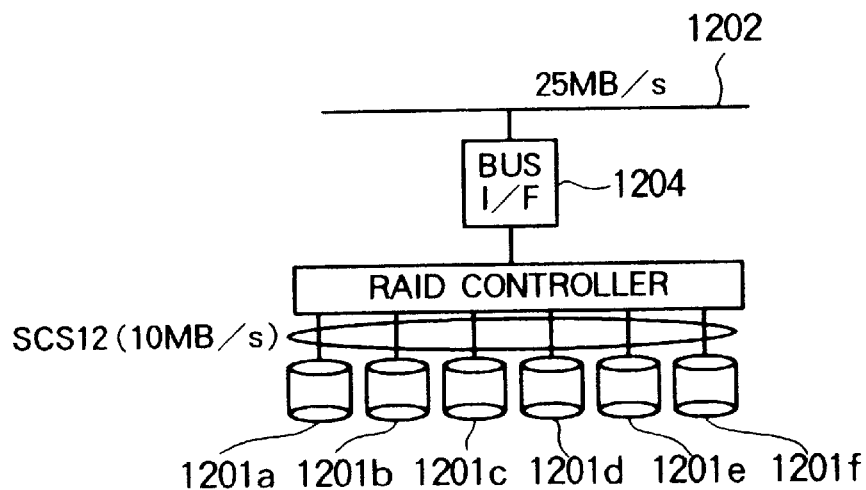
FIGS. 12A and 12B are diagrams showing the configuration of RAID3 and a period of time necessary to access data.

FIG. 12A shows the structure of the RAID3.

In the RAID3, data accesses are conducted in bit or byte units for a plurality of magnetic disks 1201a to 1201f in a parallel fashion to improve throughput thereof. The magnetic disks 1201a to 1201f connected in a parallel manner via a bus interface 1204 to a bus 1202 are rotated in a synchronized fashion. There may be disposed a magnetic disk for parity such that when a block failure takes place, data of the block can be appropriately restored.

Figure 12B:
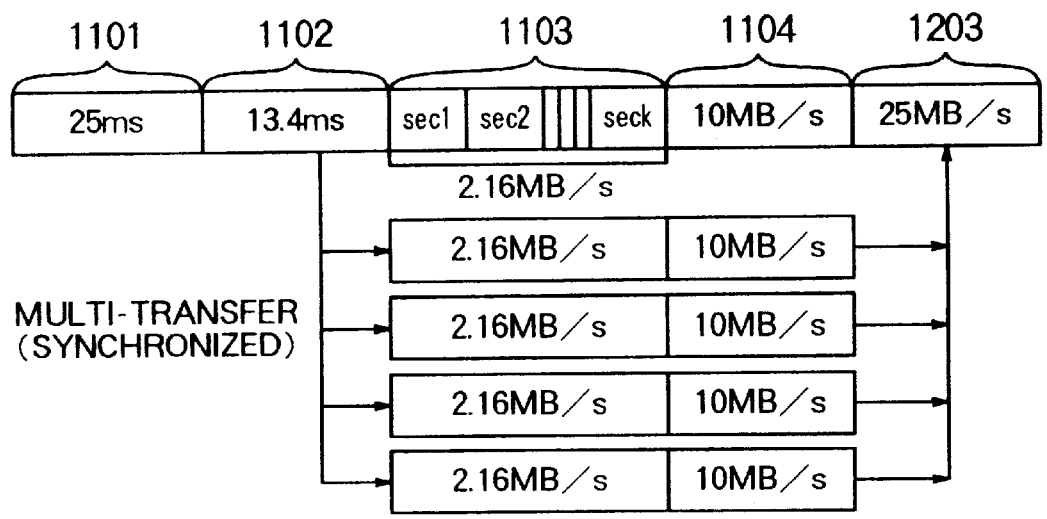

FIG. 12B shows the period of time necessary to read data from the RAID3 in the worst case.

When the magnetic disks are rotated in a synchronized fashion, there is established synchronization between the head seek time 1101 and the latency 1102. Thereafter, the disk read time 1103 and the SCSI transfer time 1104 of data to the buffer of the RAID controller can be concurrently elapsed. When compared with the case of a single magnetic disk, the data access throughput can be consequently improved by the RAID3.

The configuration of FIG. 12A in which data is transferred via a bus interface 1204 and the bus 1202 to the memory is necessarily attended with the bus transfer time 1203. In a similar fashion as for the case of the single magnetic disk, when the disk read operation, the SCSI transfer, and the bus transfer are carried out according to the pipeline transfer procedure, the access speed can be significantly increased as compared with the system of FIG. 12A.

Subsequently, description will be given of a method delivering video data when the access unit is increased in FIG. 27.

Figure 27:
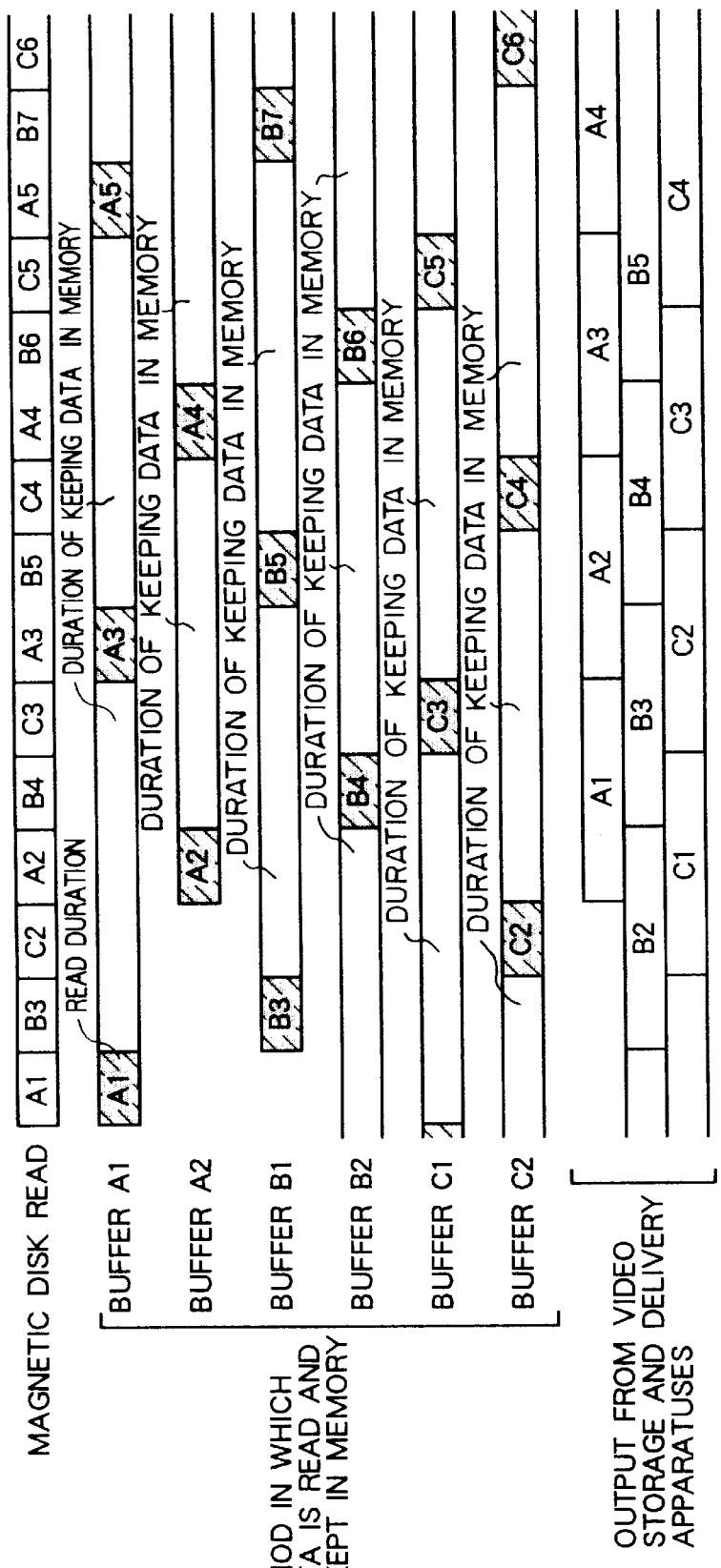
FIG. 27 is a timing charge showing an operation to deliver video data in the system of the present invention.

FIG. 27 is a timing chart of operation to simultaneously deliver three video data items A, B, and C from one magnetic disk device. Portions of video data A1 to A4, B3 to B7, and C2 to C5 are sequentially read from the disk system to be then kept in a memory. The memory includes buffers for the respective video channels. In FIG. 27, two buffers are prepared for each channel. Namely, there are disposed six buffers A1, A2, B1, B2, C1, and C2.

The video data items are kept in the memory for a predetermined period of time to be thereafter sequentially delivered therefrom according to a time axis. Before the video data items are entirely delivered from the memory, video data portions to be delivered next are read from the magnetic disk device to be kept in the other buffers. Repeating the operations described above, a plurality of video data items accumulated in one magnetic disk device can be supplied to clients at the same time.

Figure 13:
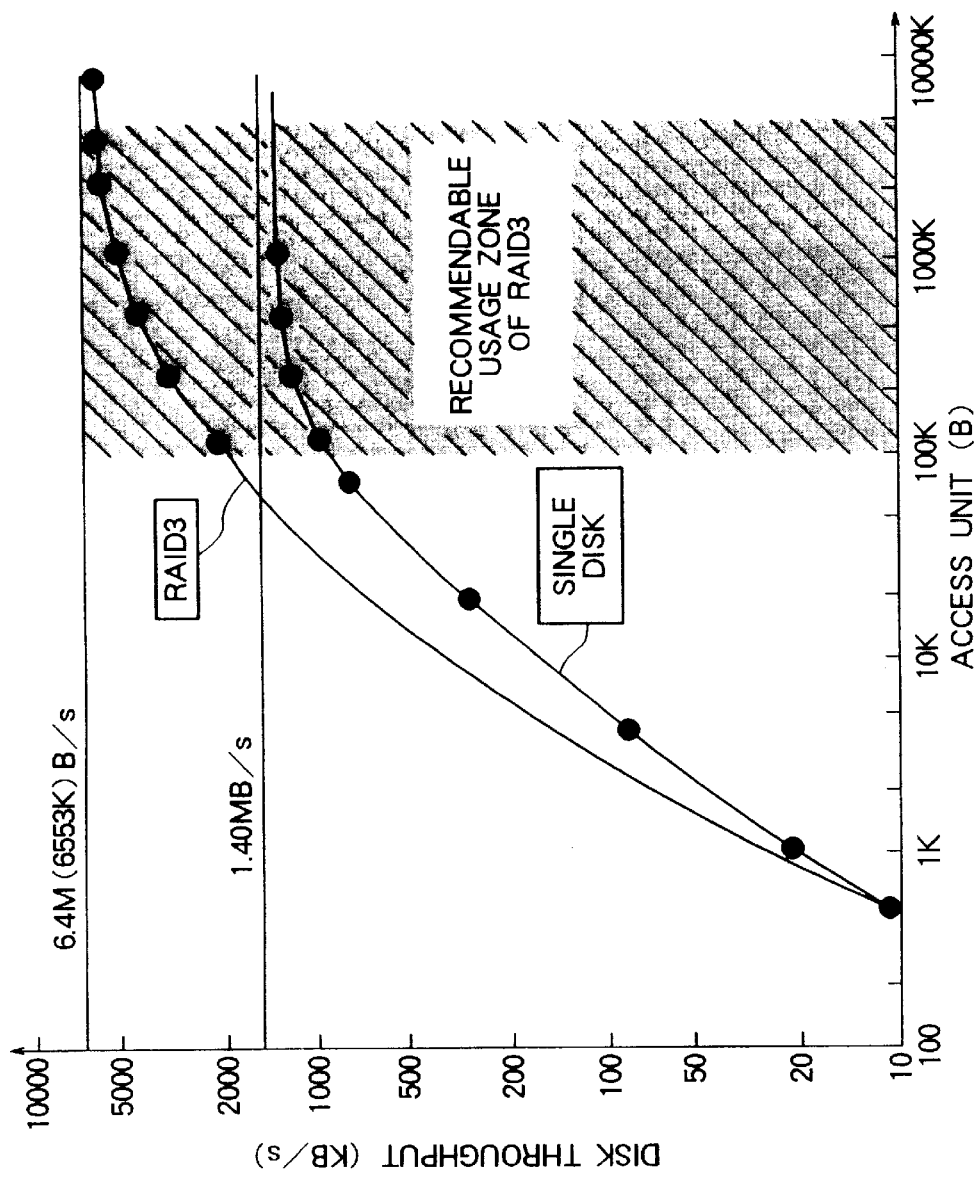
FIG. 13 is a graph for explaining throughput per data access unit when RAID3 is used as the data storage device.

FIG. 13 shows throughput of the data read operation per access unit when five magnetic disk devices are employed in the RAID3 of FIG. 12. The throughput is efficiently increased when the disk access is conducted in the access units shown in the shadow portion. More-over, the access efficiency is improved when the access unit is increased when compared with the case of one disk unit shown in FIG. 11.

In either case of the single magnetic disk and the RAID, the access efficiency is improved by increasing the access unit. However, when a plurality of channels are simultaneously used for the data delivery, the period of time in which the data storage devices are occupied by one channel becomes greater. Consequently, when a special reproduction request such as a fast forward or backward reproduction is made, the response time is increased. Therefore, in addition to an operation to simply increase the access unit, it is necessary to set the access unit according to the user's need and the application.

Figure 14:
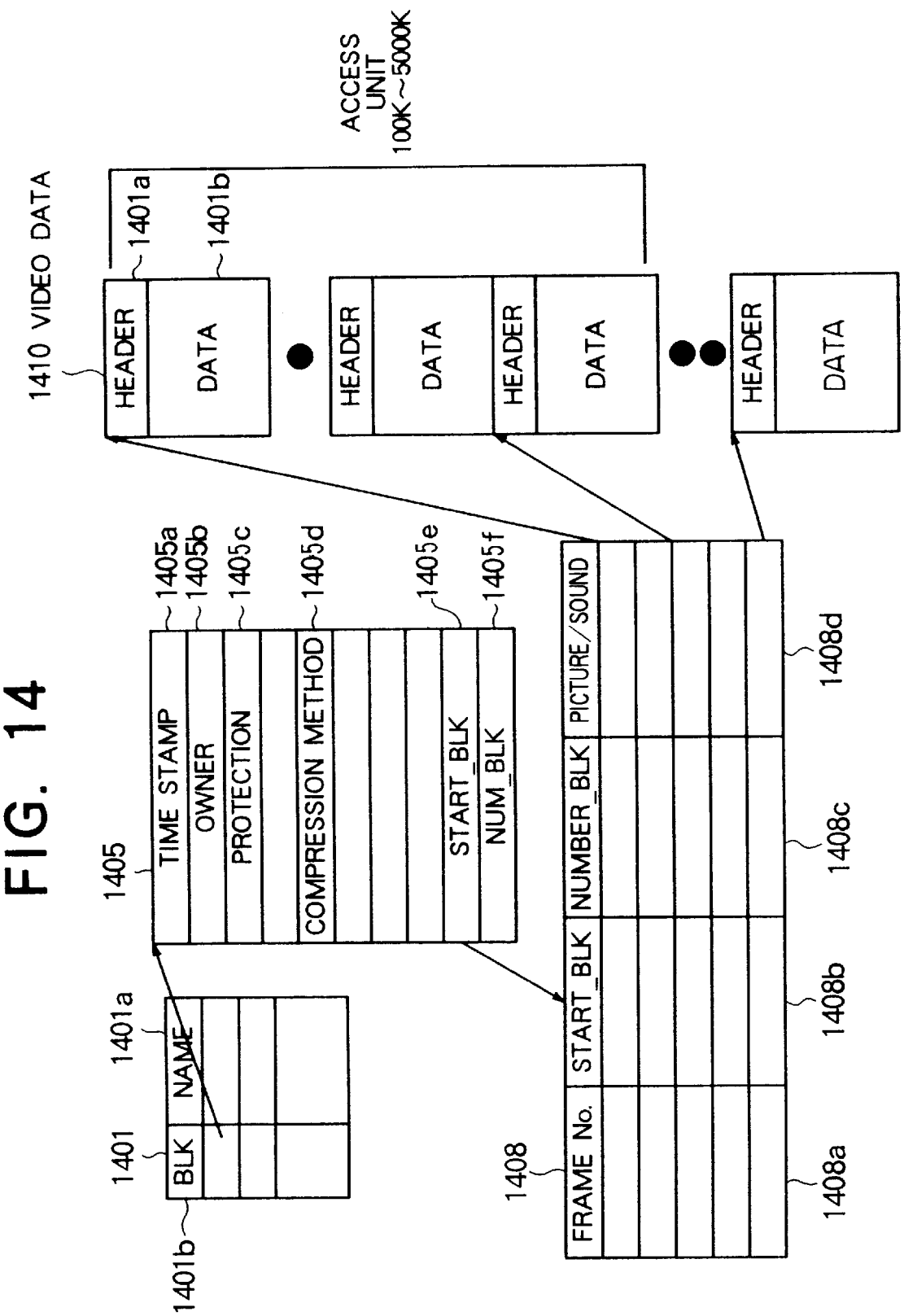
FIG. 14 is a diagram showing an example of the data storage format of video data in the data storage device.

FIG. 14 shows the disk layout on a disk when video data is stored on a data storage device such as a magnetic disk or an optical disk in the video storage and delivery apparatus 102 of FIG. 4. A reference numeral 1401 denotes a route directory in which a data title 1401a and a block address 1401b of file information of the data are stored. A numeral 1405 indicates file information of video data to keep therein a data write time 1405a, a data owner 1405b, a protection type 1405c, a data compression method 1405d, and a start address 1405*e* at which a frame address table 1408 of the data is written. The start address 1405*e* is used to call the frame address table 1408. A numeral 1408*a* denotes a frame number, a numeral 1408*b* indicates a start address, a numeral 1408*c* designates the number of blocks, and a numeral 1408*d* denotes voice data, an image, or the like. Video or audio data 1410 includes a head field 1401*a* and a data field 1401*b*. In the header field 1401*a*, there are written in advance such information necessary for data delivery as the configuration of the data field and the data size. For a single magnetic disk, the access unit is specified as, for example, 100 kilobytes to 512 kilobytes. When the RAID is adopted as the data storage, the access unit is set to a value ranging from approximately one megabyte to two megabytes.

Figure 15:
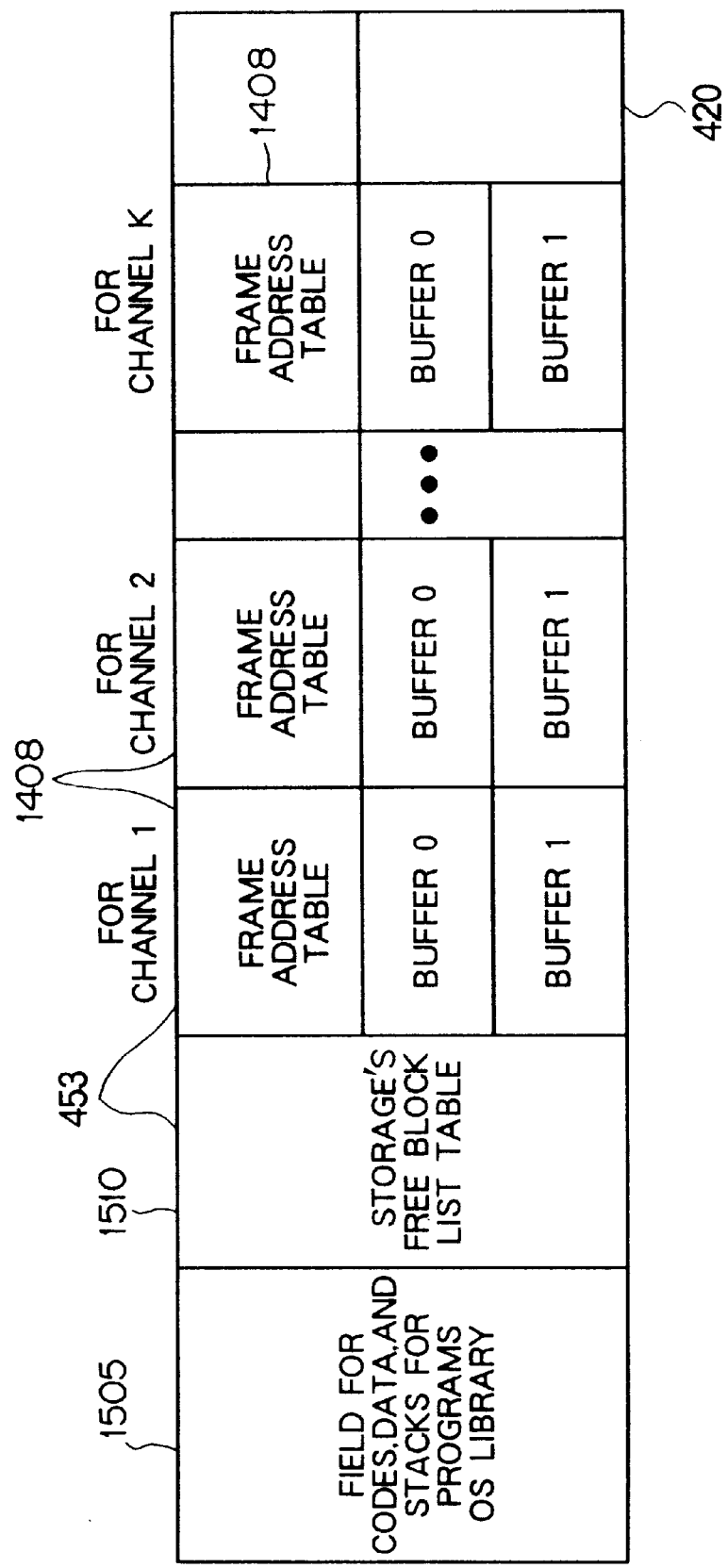
FIG. 15 is a diagram showing an example of the memory layout to deliver video data.

FIG. 15 shows a physical memory layout when video data is delivered by the operation of FIG. 27. On receiving a data read request, the video storage and delivery apparatus 102 loads the frame address table 1408 from the data storage device onto the semiconductor memory (the memory 453 of FIG. 4) and then stores in buffers 1 and 0 (denoted by 420 in FIG. 4) the data read from the data storage device. In the subsequent operation, using the table 1408, the storage address can be instantaneously obtained for an arbitrary data item. In the memory 453, there are also stored, for example, a control program 1505 of the CPU 451 and a control program 1510 of a control program for magnetic disks.

Since the data format of FIG. 14 and the memory layout of FIG. 15 are loaded beforehand, for a video data item once accessed, an address thereof in the data storage device can be obtained without conducting access thereto.

In the video storage and delivery apparatus, the data access is frequently carried out to the data storage device, for example, as shown in FIG. 27. Consequently, it is desired to minimize operations of any data access other than the video data access to the data storage device.

According to the present invention, for video data for which a video delivery request is issued, a frame address table related thereto is first loaded in the memory. Thereafter, the data storage device is accessed according to information in the memory. This mitigates the load imposed on the data storage apparatus and makes it possible to increase the number of video channels available for the data delivery. Furthermore, the period of time necessary to read video data can be easily determined and the scheduling of the read operation can be simplified, which facilitates the QOS control.

Next, description will be given of a special reproduction method for a fast forward reproduction, a fast backward reproduction, or the like.

FIGS. 16A and 16B show a data access method in the fast forward or backward reproduction.

FIG. 16A shows a video data access method in the fast forward or backward reproduction when each frame includes about 16 kilobytes (KBs). A thinning-out operation is conducted for frames 1601 to obtain therefrom every n-th frames 1601 (n is an integer) so as to deliver data items, thereby conducting the special reproduction or playback of data. In this case, video data items are stored consecutively.

FIG. 16B shows a period of time required to read the data. In the first data access, the head seek time 1101 is 25 ms, the disk read time 1103 is 7.23 ms (2.16 MB/s), and the SCSI latency 1104 is 3.91 ms. For the data access of the first frame, the head seek time 1101*a* is the same as for the cases of FIGS. 11A, 11B, 12A, and 12B. However, in the second and subsequent data accesses, since the data is in the neighborhood of the head, the head seek time 110*b* is minimized.

In ordinary data reproduction, when the magnetic disk access unit is set to 256 kilobytes (KB) and the period of time in which the magnetic disk can be occupied by one channel is fixed, throughput of the fast forward or backward reproduction is lowered to about half that of the ordinary reproduction for the following reason. In the ordinary reproduction, the magnetic disk access is conducted in the 256 KB unit. In contrast thereto, the access unit is decreased to 16 KB in the fast forward or backward reproduction. Consequently, the ratio of overhead in the disk access is increased and hence the throughput is decreased.

FIG. 16C shows specifications of data items reproduced on the client side. In the fast forward or backward reproduction, the frame rate (transfer rate) is lowered to about half that of the ordinary reproduction. When the period of time in which the magnetic disk can be occupied by one channel in the fast forward or backward reproduction is conversely set to approximately twice that of the ordinary reproduction, the fast forward or backward reproduction can be accomplished at the same frame rate as that of the ordinary reproduction.

Referring now to FIGS. 17A to 17C, description will be given of a method of achieving the quick forward or backward reproduction. FIG. 17A shows the format of data 1701 of the ordinary reproduction for intra-frame compressed data and the format of data 1702 of such a special reproduction as the fast forward or backward reproduction for the data described above. FIG. 17A shows the format of data 1703 of the ordinary reproduction for compressed data such as MPEG for intra-frame estimation and the format of data 1704 of the fast forward or backward reproduction for the data above. The data 1704 is formed with intra-pictures 10, 16, 112, 118, etc. of the data 1703.

FIG. 17C shows the storage layout of data items in the data storage device. According to an aspect of the layout, two kinds of data items respectively of the ordinary reproduction and the special reproduction are specified beforehand. Video data includes control data 1705 in which a compression method, a reproduction method, a data structure, a reproduction time, and the like are described, a frame address table 1706 for ordinary reproduction data, access data for ordinary reproduction 1707, a frame address table 1708 for special reproduction data, and access data for special reproduction 1709.

When a video data read request is issued, the video storage and delivery apparatus loads the frame address tables 1706 and 1708 in the memory and then delivers video data by reference to the table 1706 or 1708 for the ordinary or special reproduction request, respectively. With this provision, the special data reproduction can be achieved.

In the intra-frame compressed data of FIG. 17A, when the access data 1702 for special reproduction is produced by selecting every 20th frame from the access data 1701 for ordinary reproduction, the increase in the storage capacity is only 5%.

FIGS. 18A to 18C show specifications of data items when the special reproduction method of FIGS. 16A to 16C are used when the RAID3 of FIGS. 12A and 12B is used as the data storage device. In the RAID3, the data access throughput is improved by increasing the access unit as compared with the case of the single disk. In these diagrams, the reference numerals of FIGS. 12A, 12B, and 16A to 16C are also utilized.

FIG. 18B shows the period of time necessary for a data read operation in the special reproduction when the access unit in the ordinary reproduction is set to 1024 KB. FIG. 18C shows specifications of video data on the client side in the special reproduction. When the period of time in which the data storage or accumulation device can be occupied by one channel is fixed, the frame rate of the special reproduction is set to about 1/7 of the frame rate of the ordinary reproduction. As the access unit is increased, the data access efficiency is improved particularly in a system including the RAID as the storage apparatus. However, since the access unit is specified as one frame for the special reproduction in the method of FIGS. 18A to 18C, the difference in the data access performance becomes greater between the ordinary reproduction and the special reproduction.

Figure 19A:
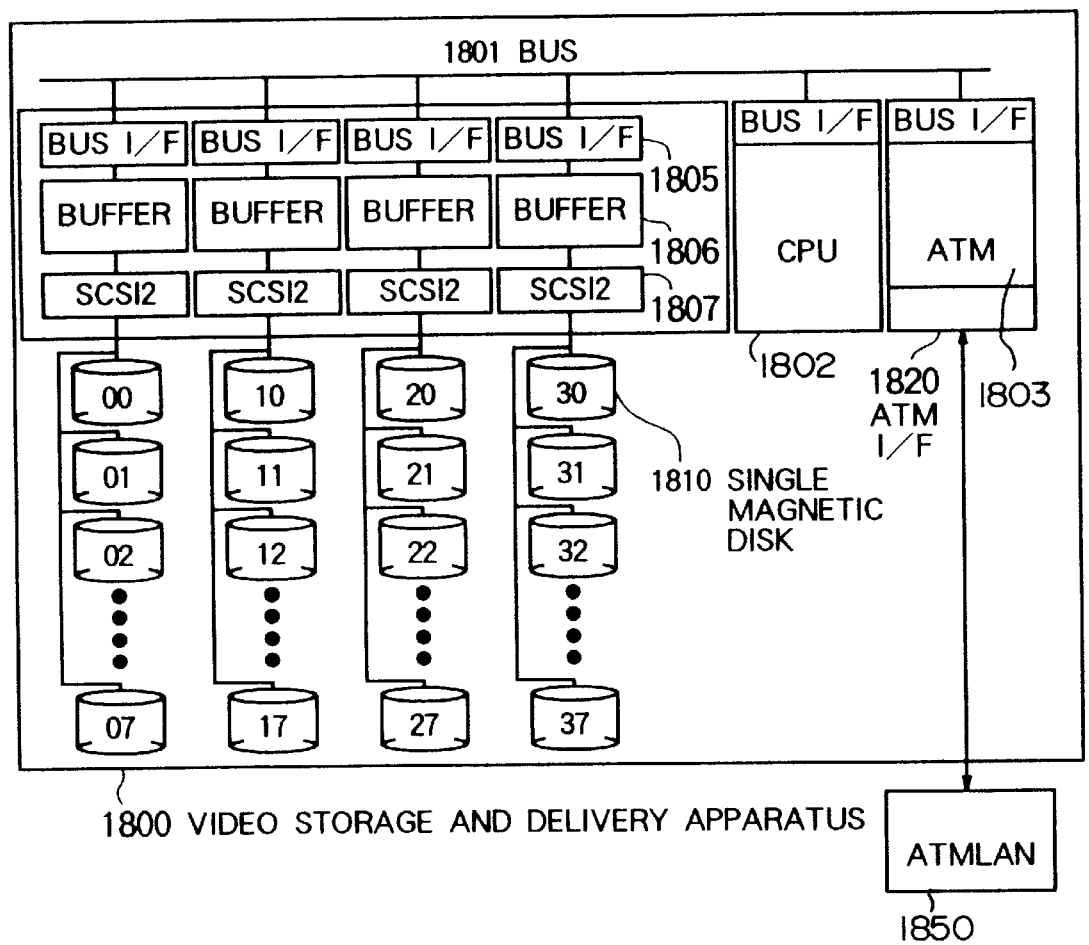
FIGS. 19A and 19B are diagrams showing the configuration of another embodiment of the video data storage and delivery apparatus according to the present invention.
Figure 19B:
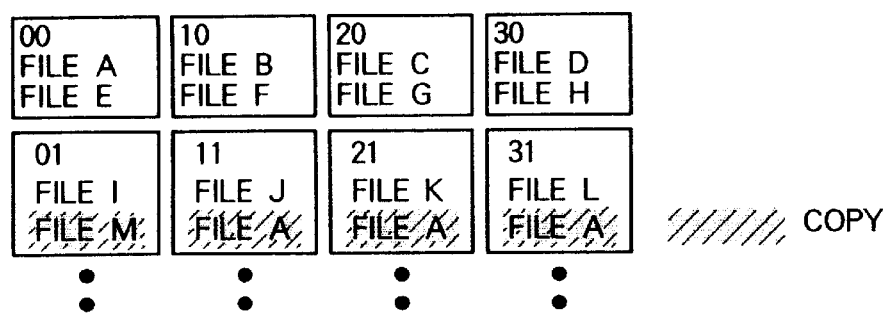

FIGS. 19A and 19B show another example of the configuration of the data storage device.

In FIG. 19A, a numeral 1800 denotes a video storage and delivery apparatus, a numeral 1801 indicates a bus, a numeral 1805 denotes a bus interface, a numeral 1806 designates a buffer to temporarily store therein data, a numeral 1807 is an SCSI interface, a numeral 1810 denotes a single magnetic disk, a numeral 1802 indicates a CPU, a numeral 1803 designates an ATM board, a numeral 1820 is an ATM interface, and a numeral 1850 denotes an ATM LAN.

The CPU 1802 can access each of the magnetic disks 1810 connected to a plurality of SCSI interfaces 1807. Each SCSI interface 1807 is linked with one of the disks 1810 or a plurality of disks 1810.

In the configuration of FIG. 19A, when the access unit for a single magnetic disk shown in FIG. 11 is used for disk access operations, the overall data access throughput is improved by parallel operations of disks while the frame rate of the special reproduction is fixedly set to approximately half that of the ordinary reproduction. When a traffic concentration or jam occurs on the bus 1801, the data transfer point of time through the bus 1801 can be shifted by the buffer 1806. During the operation of the bus 1801, video data can also be read from a magnetic disk 1810.

FIG. 19B shows an example of the file layout when video data is stored in the data storage device of FIG. 19A. The same reference numerals are correspondingly used in FIGS. 19A and 19B.

Files A and E and files B and F are stored on magnetic disks 00 and 10, respectively. Similarly, files C and G, files D and H, and files I and M are stored on magnetic disks 20, 30, and 01, respectively. Files J and A and files L and A are stored on the magnetic disks 11 and 21, respectively. The file A contains video data items which are frequently accessed by clients.

In FIG. 19A, when access requests are concentrated onto one video data item, the disk 1800 on which the data item is stored or the SCSI 1807 related thereto disadvantageously becomes a bottleneck. This may consequently lead to a problem that a plurality of requests cannot be appropriately processed. This problem can be solved by storing the video data item having a high access frequency on other magnetic disks 1810 connected to the other SCSI cables as shown in FIG. 19B.

Figure 20A:
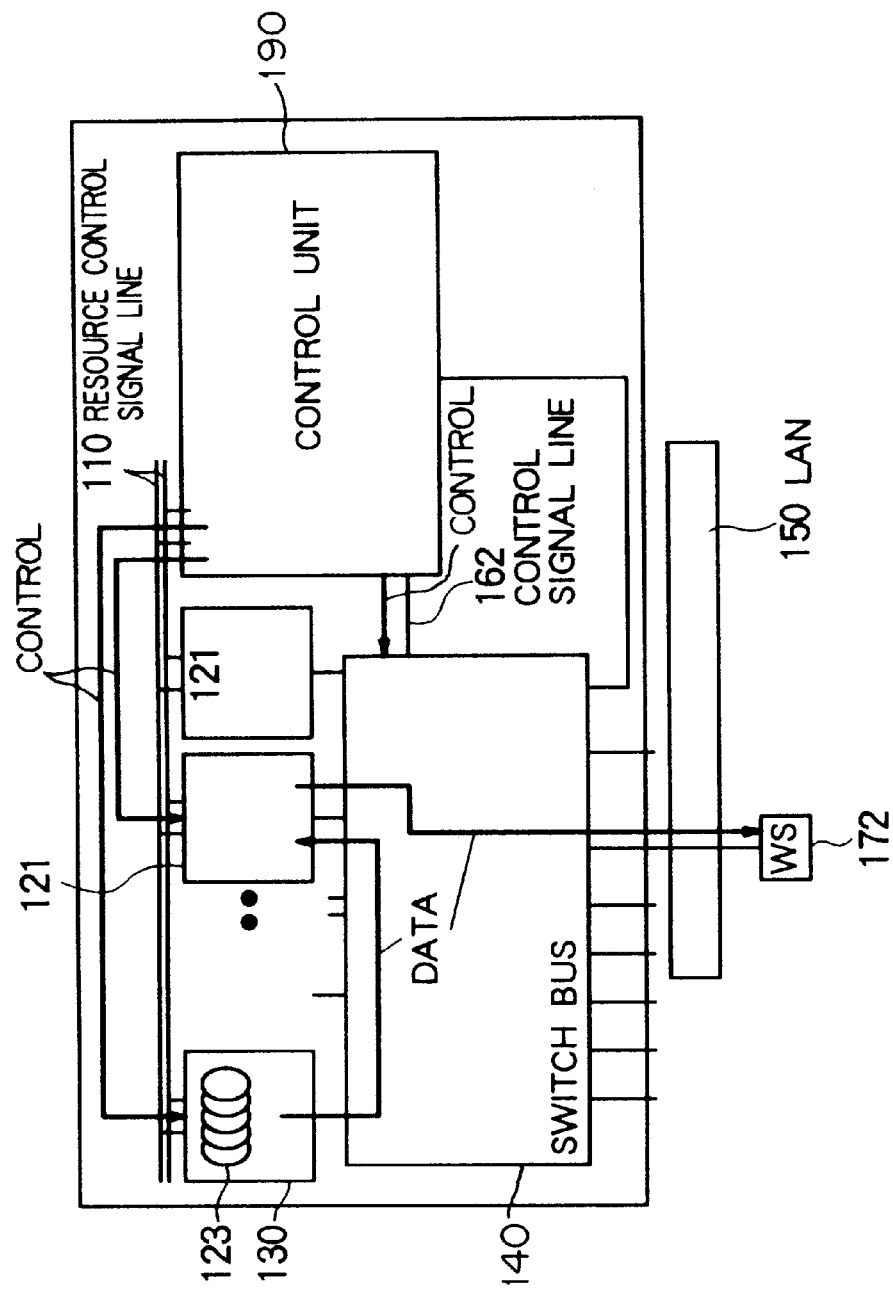

Referring now to FIGS. 20A and 20B, description will be given of the access operation when an optical jukebox is employed as the storage apparatus of video data.

The cost necessary for each bit, namely the bit cost of an optical disk, is less expensive than that of a magnetic disk. Consequently, to lower the system cost, it is quite effective to adopt an optical disk for the video storage or accumulation device. However, there exists a problem that when an optical disk is being accessed by one user (or via one channel), the optical disk cannot be simultaneously accessed by another user (or via another channel).

According to the present invention, to enable a plurality of users (channels) to simultaneously access the same optical disk, optical jukebox, or the like, there is adopted a cache method. Namely, data in the optical disk storage device is temporarily stored in a high-speed data storage device such as a magnetic disk device so that while the data is being delivered from the magnetic disk device, another video data item is transferred from the optical disk device to the magnetic disk device. While the video data is being delivered from the magnetic disk device to a client, the subsequent video data and another requested video data on the same optical disk or jukebox are transferred therefrom to the magnetic disk. In place of the magnetic disk device, there may be employed any other appropriate memory such as a semiconductor memory.

FIG. 20A shows a circuit configuration in which the cache function is carried out using the video storage and delivery system 101 of FIG. 1. A reference numeral 121 indicates a data storage medium having a high-speed response such as a magnetic disk or a semiconductor memory.

FIG. 20B shows the cache operation of video data items in the constitution of FIG. 20A. A numeral 123 designates a data storage medium having a low-speed response such as an optical jukebox.

As can be seen from FIG. 20B, when it is desired to read video data items D1+D2+D3+ . . . +DN forming a data stream, portions of video data are sequentially copied from the data storage device 123 onto the high-speed medium 121. The video data items thus copied are successively delivered to the client. The video data portions thus delivered are sequentially cleared from the high-speed medium 121.

Figure 21:
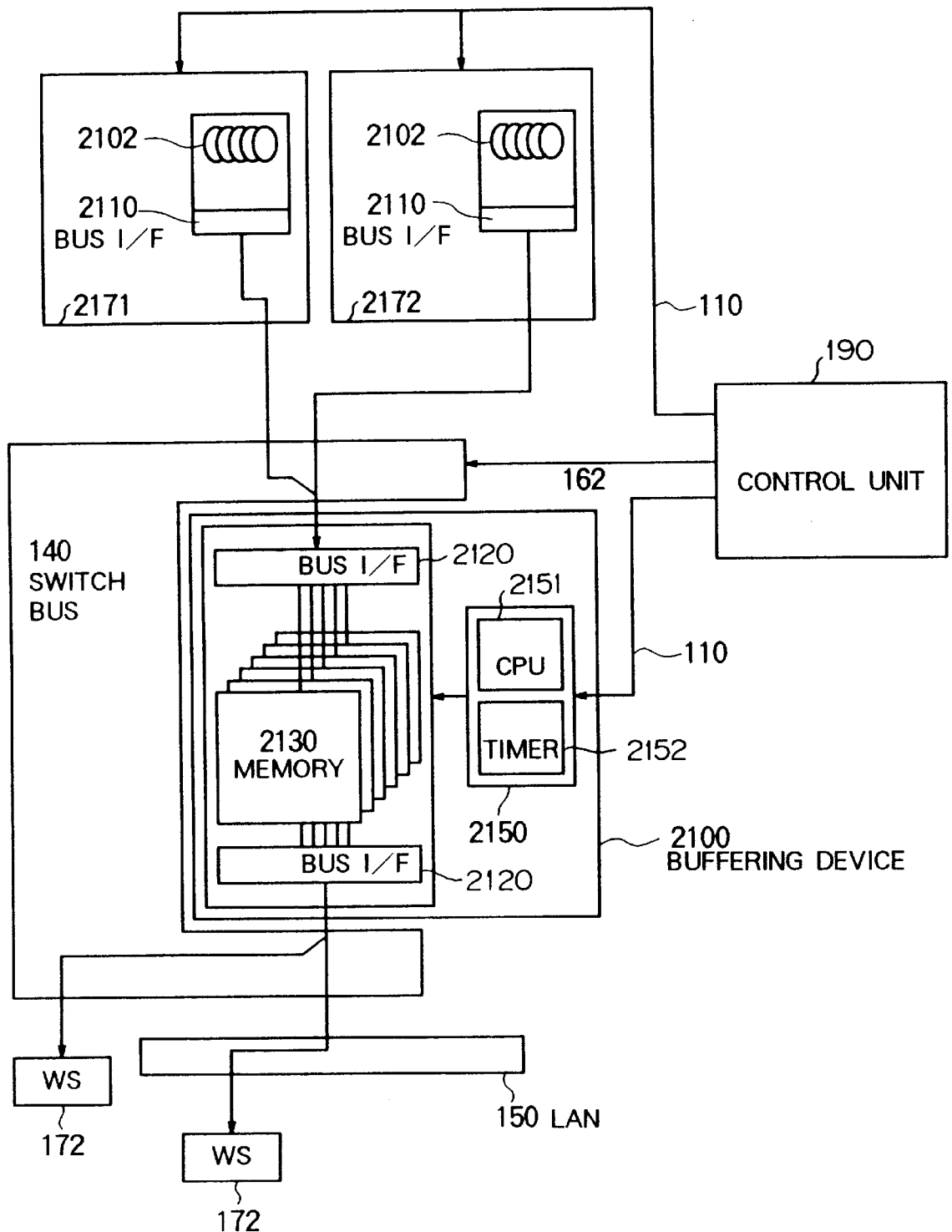
FIG. 21 is a diagram for explaining the cache function of video data according to the present invention.

FIG. 21 shows an example of the system configuration in which a semiconductor memory is used as the storage medium having high-speed response 121. In the construction, a numeral 2171 denotes a video storage device, numerals 2110, 120 and 2140 denote bus interfaces, and a numeral 2130 indicates a cache memory. The control unit 190 issues, via the resource signal line 110, an instruction to a video storage device 2172 and a control block 2150 of a buffering device 2100, and, via the control signal line 162, an instruction to the switch bus 140. The control block 2150 includes a CPU 2151 and a timer 2152.

Figure 22:
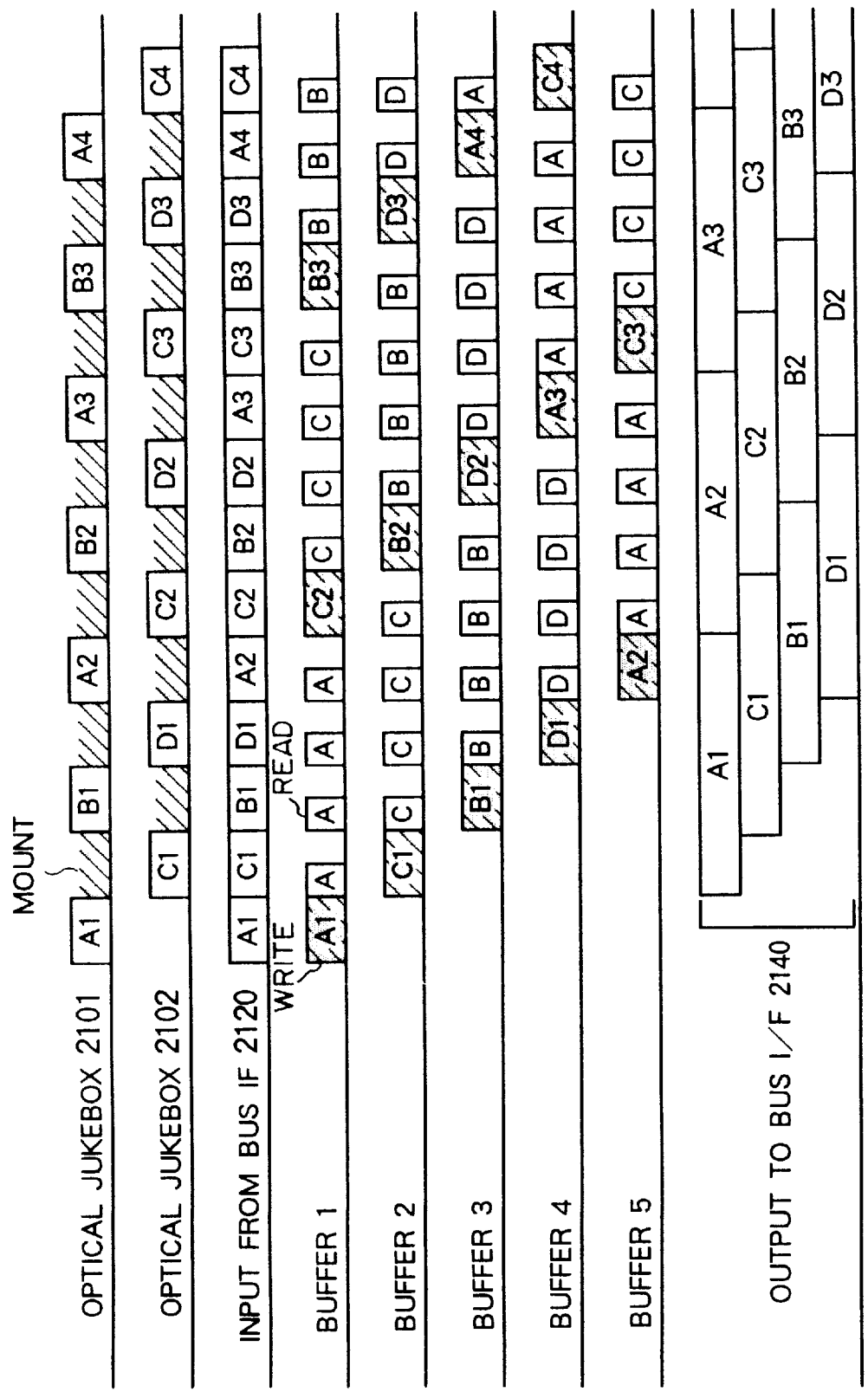
FIG. 22 is a data timing chart in the cache operation of video data.

FIG. 22 is a timing chart for explaining a data delivery operation to simultaneously transfer a plurality of video data items from the same optical disk or jukebox to a clients. Two video data items A and B in the optical jukebox 2101 and two video data items C and D in the optical jukebox 2102 are delivered therefrom at the same time according to the cache method of the present invention.

Portions Ak and Bk respectively of the video data items A and B are alternately read from the jukebox 2101. The data read operation requires a mount time and a read time as shown in the timing chart of FIG. 22. Similarly, portions Ck and Dk, respectively, of the video data items C and D are alternately read from the jukebox 2102. These data portions are fed via the switch bus 140 to the bus interface 2120 such that the sequentially received video data portions are written in buffers 1 to 5 of the memory 2130. According to the delivery time of video data, the video data is sequentially delivered via the switch bus 140 to the client. The above operation is carried out under control of the CPU 2150 and the control unit 190.

Figure 23:
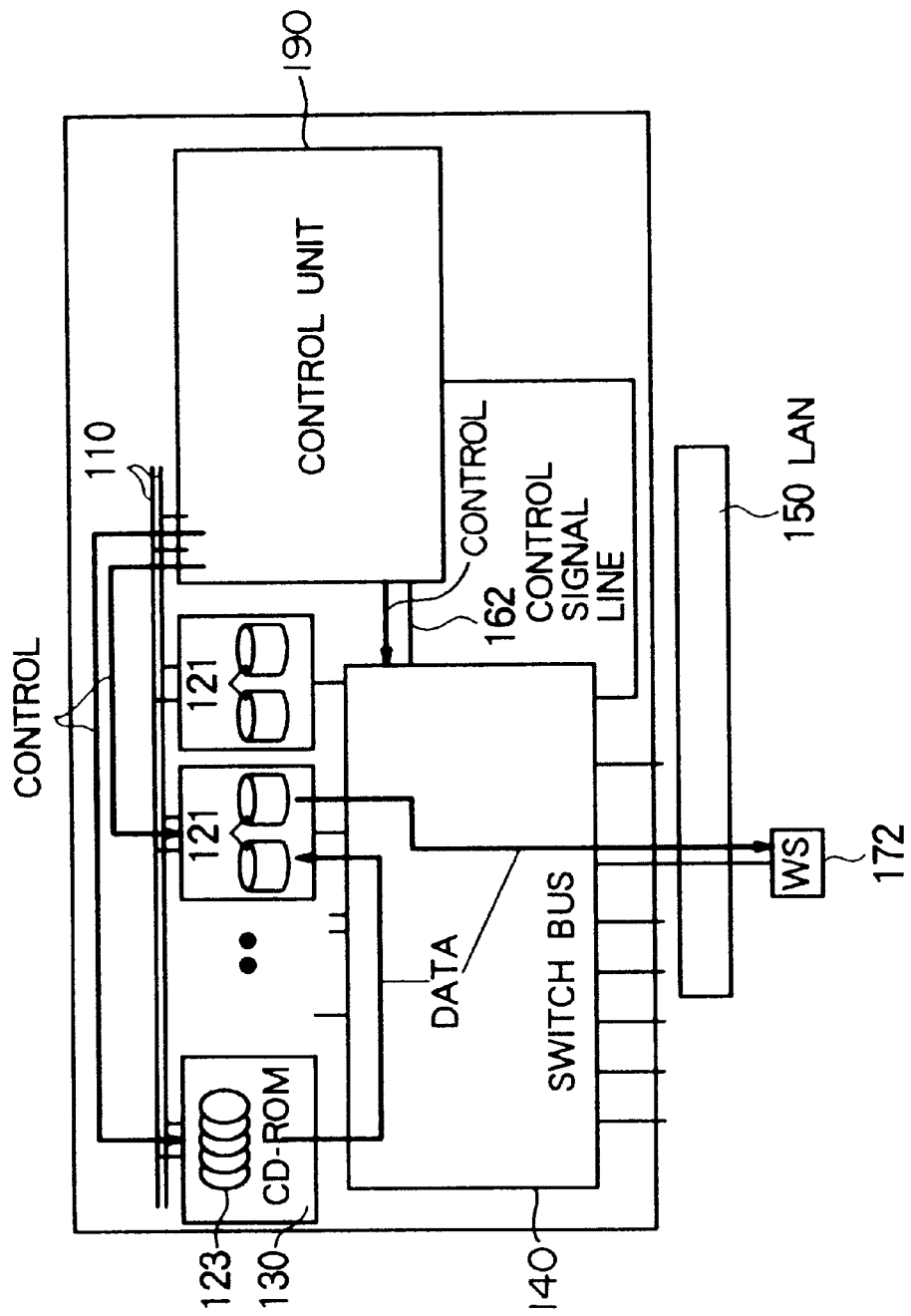
FIG. 23 is a diagram for explaining a first embodiment of the cache function in a magnetic disk device.

FIG. 23 is a variation of FIG. 21 and shows a flow of data related to the cache function using magnetic disk devices.

The cache function described above can also be achieved by the magnetic disk devices in place of the memory 2130 shown in FIG. 21.

Figure 24:
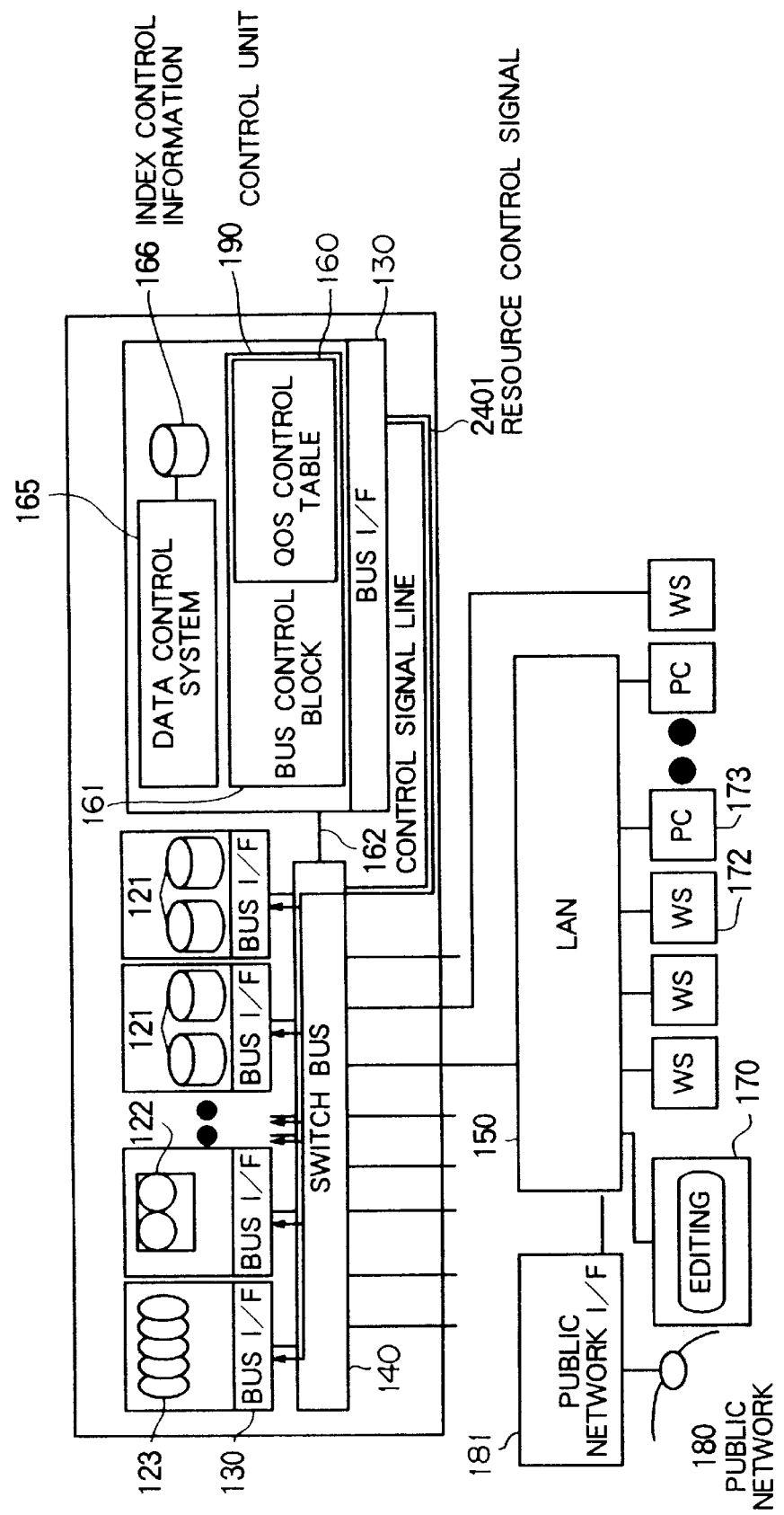
FIG. 24 is a diagram showing the configuration of another embodiment of the video storage and delivery system according to the present invention.

FIG. 24 is a variation of FIG. 1 in which a resource control signal 2401 disposed in place of the resource control signal 110 of FIG. 1 is transferred via the bus interface 130 and the switch bus 140 so as to conduct the same function as for the configuration of FIG. 1. The same reference numerals are employed in FIGS. 1 and 24. The same reference numerals are employed in FIGS. 1 and 24.

Figure 25:
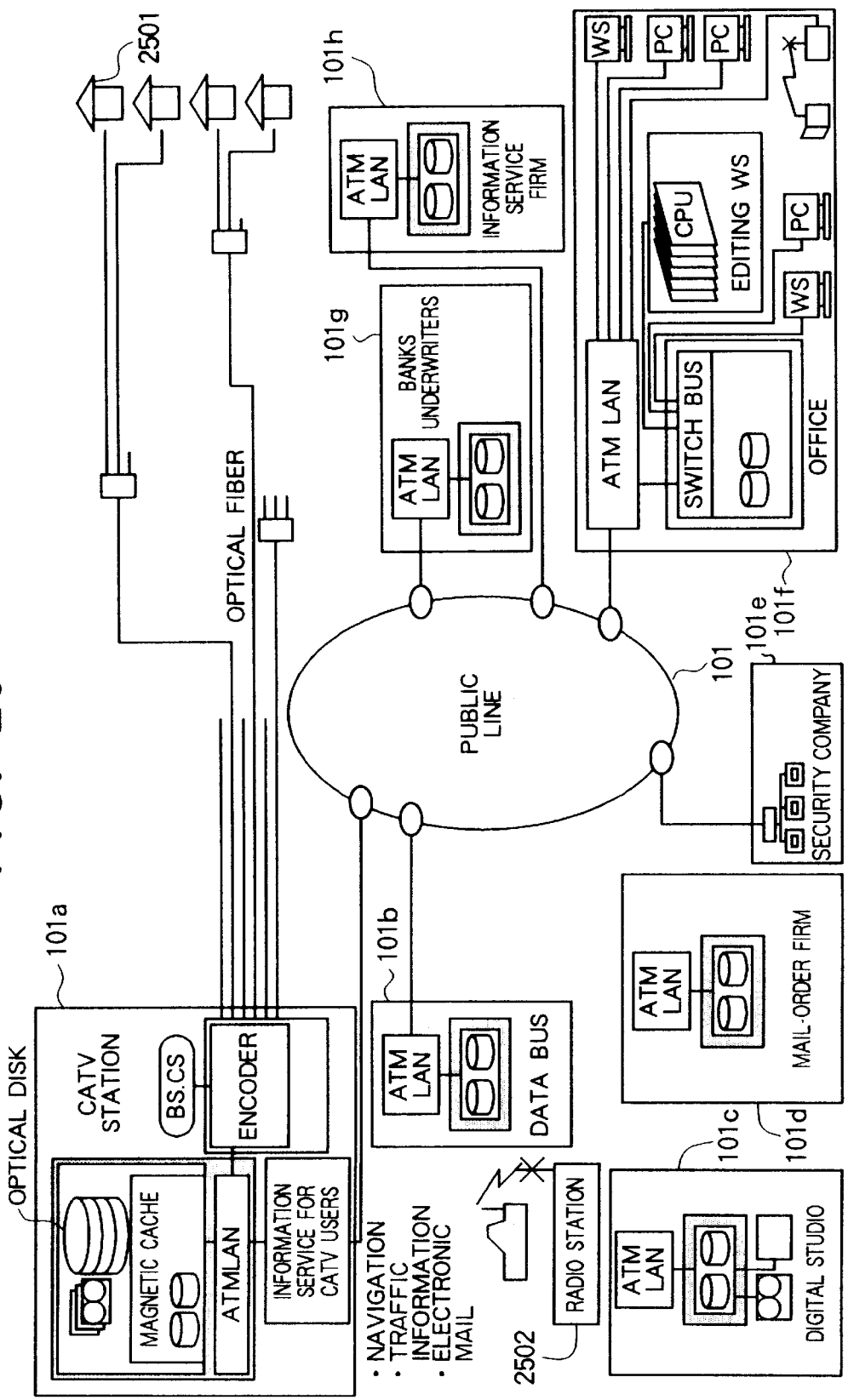
FIG. 25 is a diagram showing an application example of the video storage and delivery system according to the present invention.
Figure 26A:
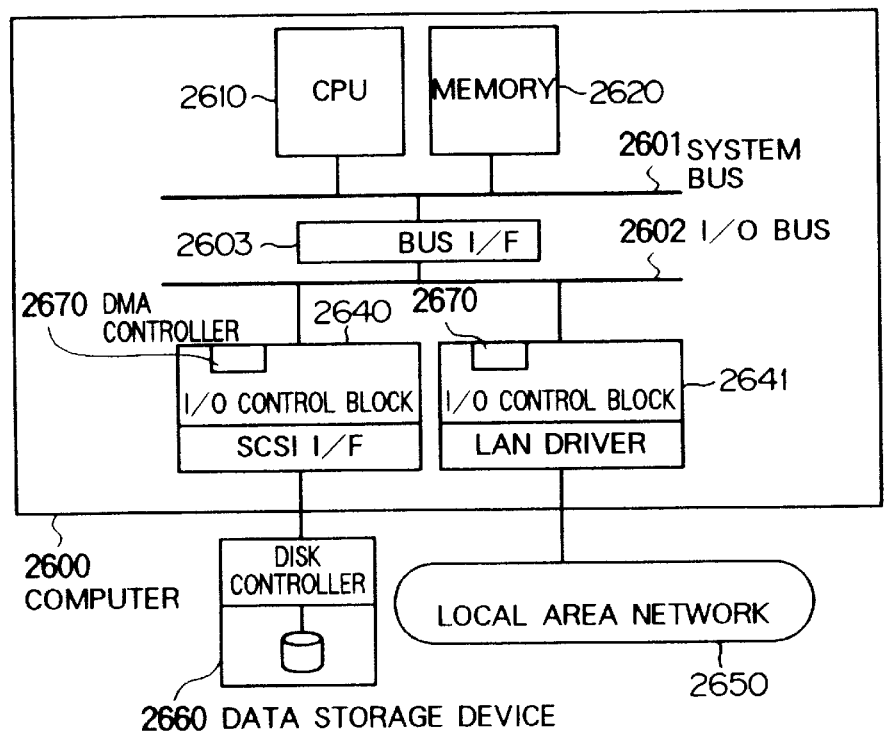
FIGS. 26A and 26B are diagrams showing an example of the constitution of a conventional computer system.
Figure 26B:
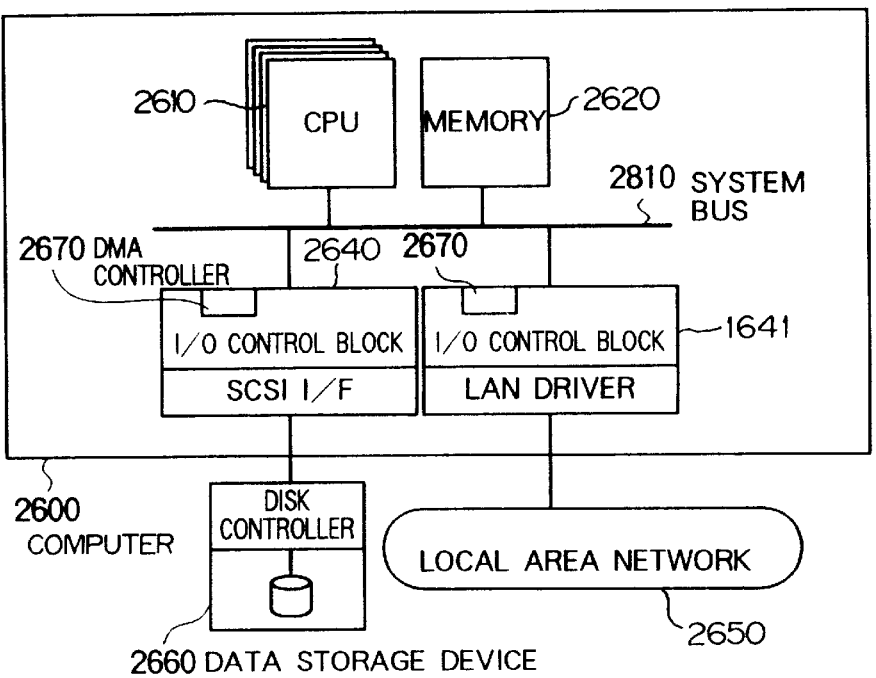

FIG. 25 shows an example of an application system according to the present invention. The video storage and delivery apparatus 101 of the present invention is applicable to various fields such as a video-on-demand system for terminals of each family 2501, games, education, TV telephones, TV conferences, medical support services, video information services, and home-shopping. Connecting the apparatuses 101 to the leased line 181 and the radio station 2502, the video information services can be further enhanced by the established network.

The video information services can be considered as services for economic and financial information, traffic news, road guidance, information of sight-seeing, travels, and hotels; seat reservation, public information services, library information services, advertisement and news for houses and rooms, TV telephones inside and outside firms, electronic libraries, lecturing services, electronic secretaries, sales support services, news-on-demand services, and accesses to data bases.

Figure 28:
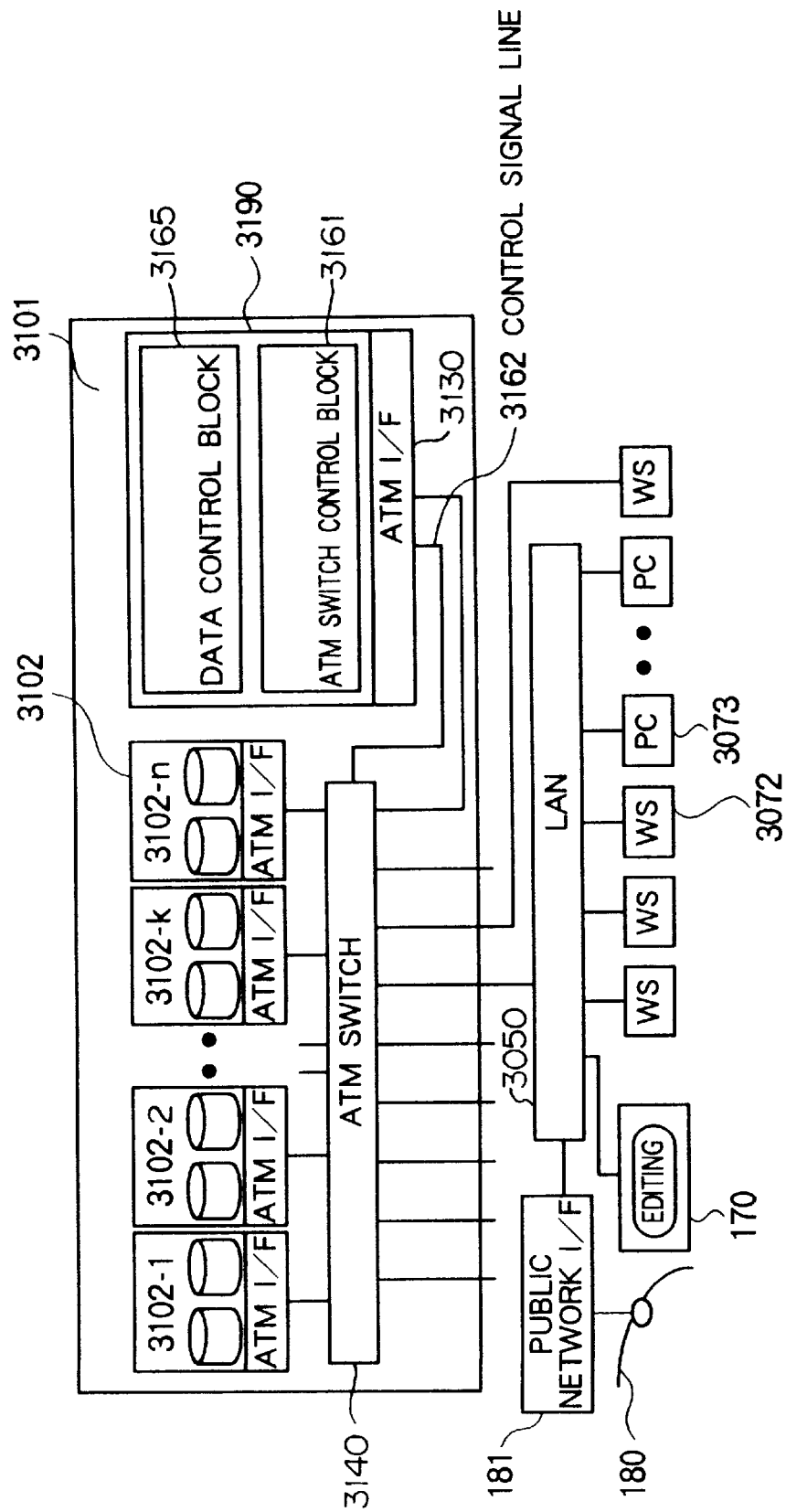
FIG. 28 is a diagram showing the configuration of another embodiment of the video storage and delivery system according to the present invention.

FIG. 28 shows another example of the configuration of the video storage and delivery system according to the present invention. A reference numeral 3101 denotes a video storage and delivery system, a numeral 3102 indicates a video storage and delivery apparatus, a numeral 3190 denotes a control unit, and a numeral 340 designates an ATM switch. A plurality of video storage and delivery apparatuses 3102-1 to 3102-n are mutually connected to each other via the ATM switch 3140. In each of the apparatuses 3102-1 to 3102-n, there is distributively stored a title of each video image.

A request from a client such as a workstation 3072, a personal computer 3073, or the CATV terminal is received by the control unit 3190. An apparatus 3102 containing a requested title or the client outputs a control signal via an ATM interface 3130 to the ATM switch 3140 according to an indication of a data control block 3165 and an ATM switch control block 3161. The apparatus 3102 starts delivering video data via the ATM switch 3140 to an LAN 3050. The other structures of FIG. 28 are the same as those of FIG. 1.

Figure 29:
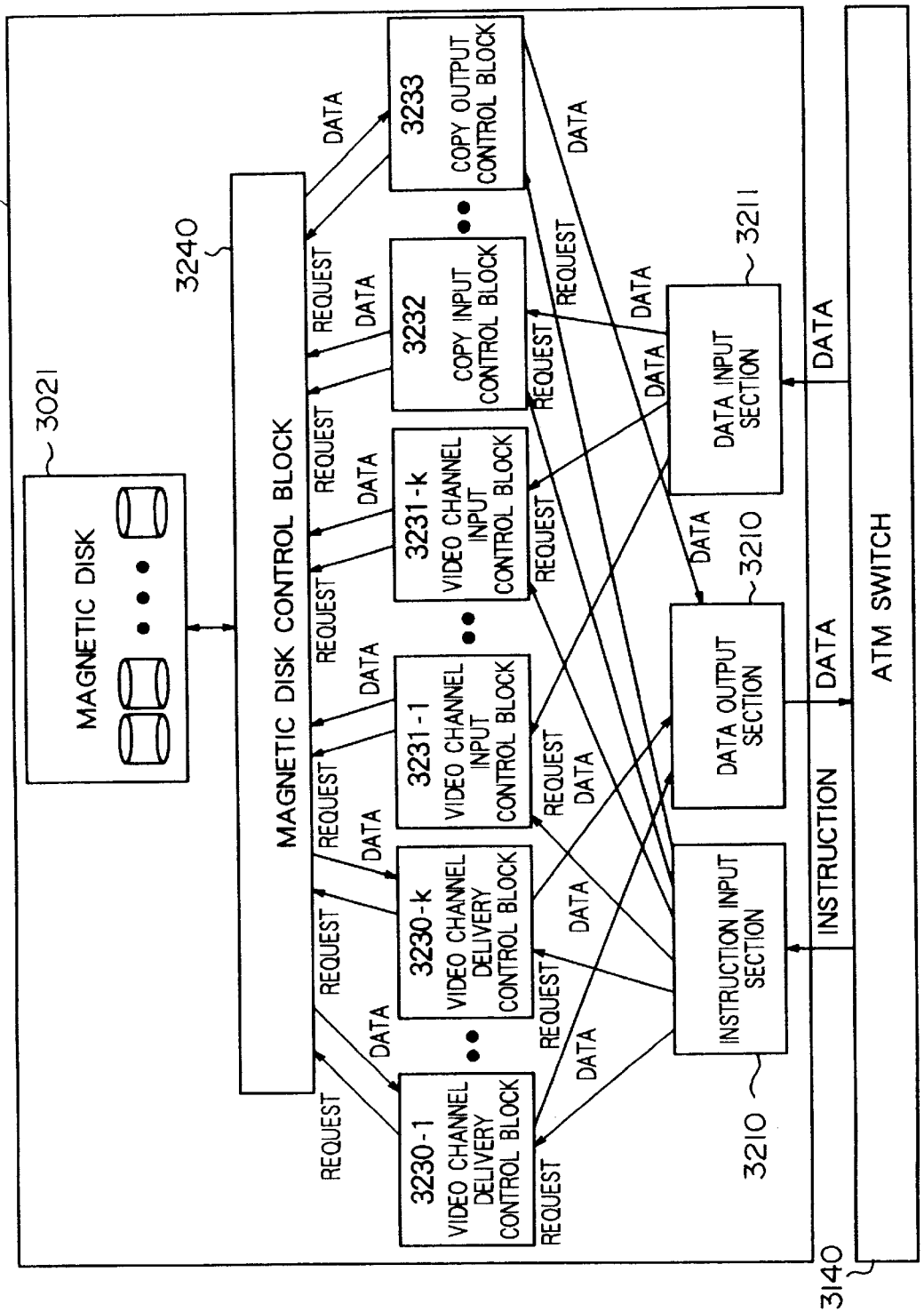
FIG. 29 is a diagram showing the functional configuration of a video storage and delivery apparatus in the system of FIG. 28.

FIG. 29 shows the configuration of the video storage and delivery apparatus 3102. A numeral 3210 denotes an instruction input section, a numeral 3211 indicates a data input section, a numeral 3220 designates a data output section, numerals 3230-1 to 3230-k denote video channel delivery control blocks, numerals 3231-1 to 3231-k indicate video channel input control blocks, a numeral 3232 denotes a copy input control block, a reference numeral 3233 designates a copy output control block, a numeral 3240 denotes a magnetic disk control block, a numeral 3021 indicates a magnetic disk, and a numeral 3140 denotes an ATM switch.

Blocks 3230-1 to 3230-k correspond to the video titles requested for delivery and conduct delivery of data items of the video title according to a time axis for the delivery to supply an appropriate video image to the client side. The blocks 3230-1 to 3230-k receive an instruction from the instruction input section 3210 such as an instruction for specification of a video title, a temporary stop of delivery, a termination of delivery, or a trick play such as quick forward or background reproduction so as to issue a request to the magnetic disk control block 3240 for necessary data. Once the delivery is started through video channels, the blocks 3230-1 to 3230-k request the disk control block 3240 to periodically read data from the disks so as to continually supply video data to the client side. Each of the data read requests has a deadline. When the deadline is exceeded, timeout takes place and the picture sent to the client may possibly be disturbed. To overcome this difficulty, it is necessary for the video storage and delivery apparatus to deliver data items according to the deadline so as to guarantee the quality of the picture delivered to the client. Namely, the quality of service (QOS) is required to be guaranteed.

When a plurality of video channels are utilized for the delivery, there frequently occur events such as a new data read request and a restart from a temporary stop. In this case, to guarantee the quality of service for a picture already in delivery, there exists a situation in which the new delivery request is to be temporarily set to a pending state. In the system of the present invention, a title onto which accesses are concentrated is copied in other video storage and delivery apparatuses 3102, namely, a replica of the title is written in the apparatuses 3102, thereby distributing accesses, which otherwise are concentrated onto one apparatus 3102, to the apparatuses 3102 containing the replica.

In the operation described above, the replica of the title is required to be created at a high speed without interrupting the picture delivery service of the apparatus 3102 having the original title. These requirements can be satisfied by generating and transferring the replica in a burst-like manner using the free periods of time of the magnetic disk devices.

There may occur a data delivery request described as follows. For example, when delivering education pictures to a client such as a firm or a school, there may take place a request "Title B is delivered at 9 o'clock". That is, the start time of video delivery is specified for a video title. There also exists such a single access request which is issued when necessary and which does not require any realtime control, for example, a request for title copy or a retrieval of directory information.

These accesses to magnetic disks can be classified as follows.

Type 1: First access request issued at the beginning of periodic data accesses. This request is to be processed as soon as possible.

Type 2: First access request issued at the beginning of periodic data accesses. A delivery time is specified for this request.

Type 3: Periodic data access

Type 4: Single data access

These data accesses have respectively different access periods.

Description will now be given of a scheduling method and a control method which guarantee for any one of these types of data accesses the quality service of pictures already in the delivery service and which prevent occurrence of the timeout due to the deadline of each video title.

As already described in conjunction with FIG. 11, since the access to a magnetic disk requires the overhead including the head seek time and the latency, there exists a nonlinear characteristic of the relationship between the access unit C (bytes) and the throughput TH (bytes/s). Assume that the relationship is expressed by nonlinear function F. The disk throughput TH is then represented as follows.

$$TH = F(C) \tag{1}$$

Figure 31:
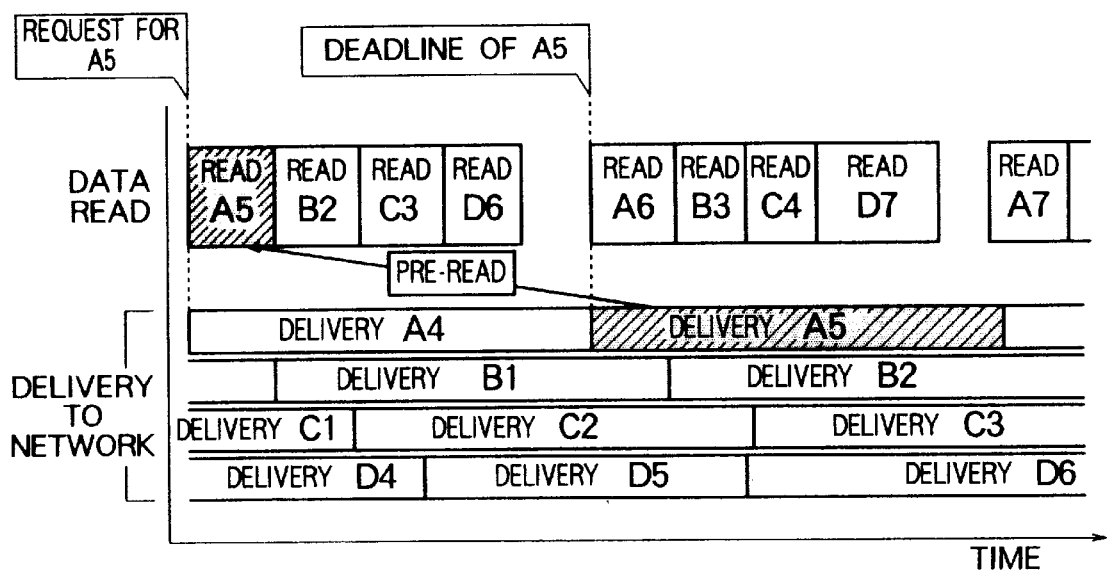
FIG. 31 is a timing chart for explaining a pre-reading method of reading video data in advance.

FIG. 31 is a timing chart for explaining operation of read requests to magnetic disks and video data read and delivery operations through video channels by a periodic task using the data access type 3 described above.

According to the present invention, to improve the utilization efficiency of magnetic disks, the access unit is increased and necessary data is read in advance as shown in FIG. 31.

For example, in the MPEG1, a 256 KB data item corresponds to a normal reproduction data for about 1.37 seconds. For example, pre-read data A5 is read into a buffer to be thereafter delivered to the network for approximately 1.37 seconds. During the data delivery operation, next video data A6 to be delivered is read in advance. Since the data pre-read operation and the data delivery operation are concurrently carried out as above, two buffers A and B are alternately used.

For example, when data stored in the data buffer A is completely delivered therefrom, a request to read the next pre-read data is fed to the magnetic disk control block 3240 so as to initiate the delivery operation of the data from the data buffer B. The deadline of each pre-read request related to one of the buffers A and B is when data is completely read from the remaining one of the buffers A and B as shown in FIG. 31.

Figure 30:
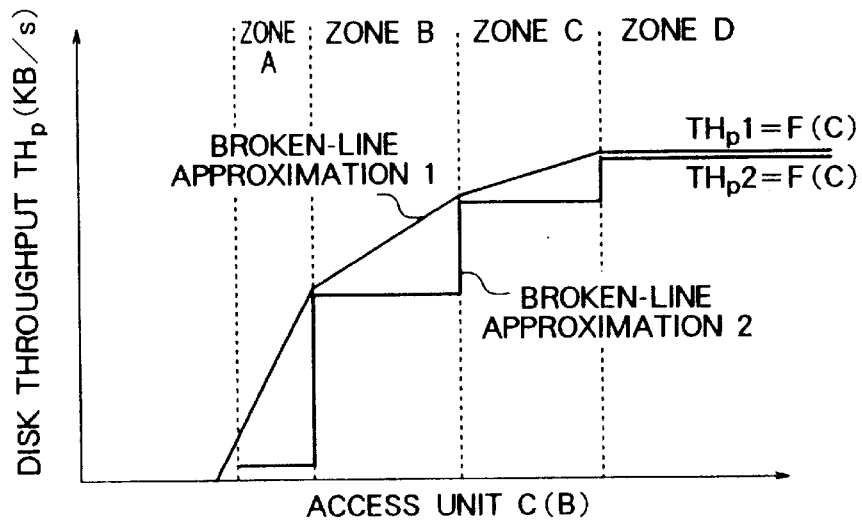
FIG. 30 is a graph showing a characteristic of throughput per access unit of a magnetic disk applied to the video storage and delivery apparatus.

The throughput characteristic of the magnetic disk can also be approximately represented by a broken-line graph as shown in FIG. 30. The approximation line 1 is obtained according to an approximation procedure called piece wise linear approximation. The graph line 1 can further be simplified into a broken line approximation 2. In the scheduling scheme of the present invention, thanks to the approximated throughput characteristic, the hardware configuration is simplified and hence the computation speed of the processor is increased.

Figure 32A:
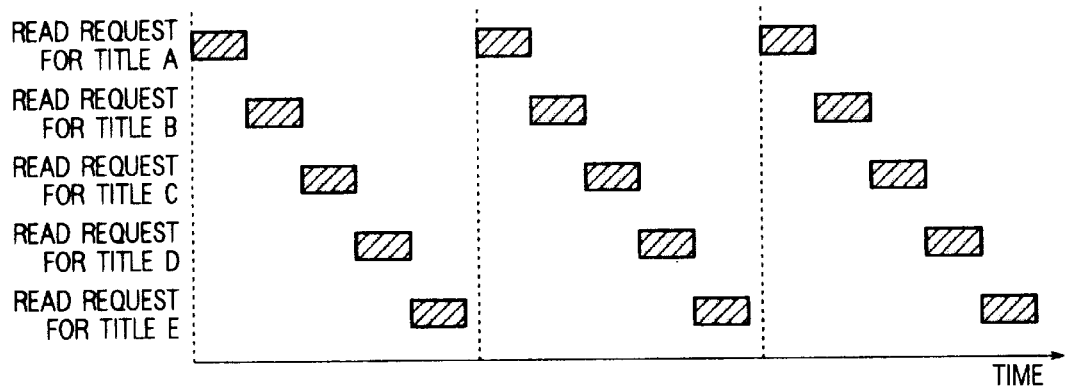
FIGS. 32A to 32C are timing charts showing relationships between read requests to magnetic disks and accesses thereto.
Figure 32B:
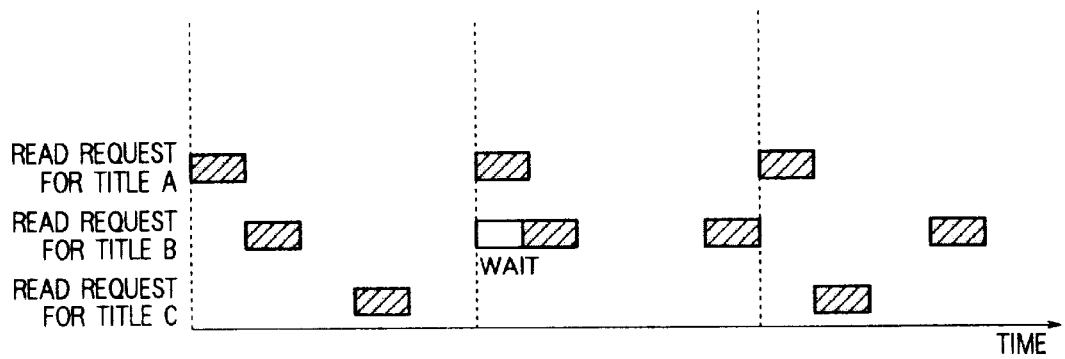
Figure 32C:
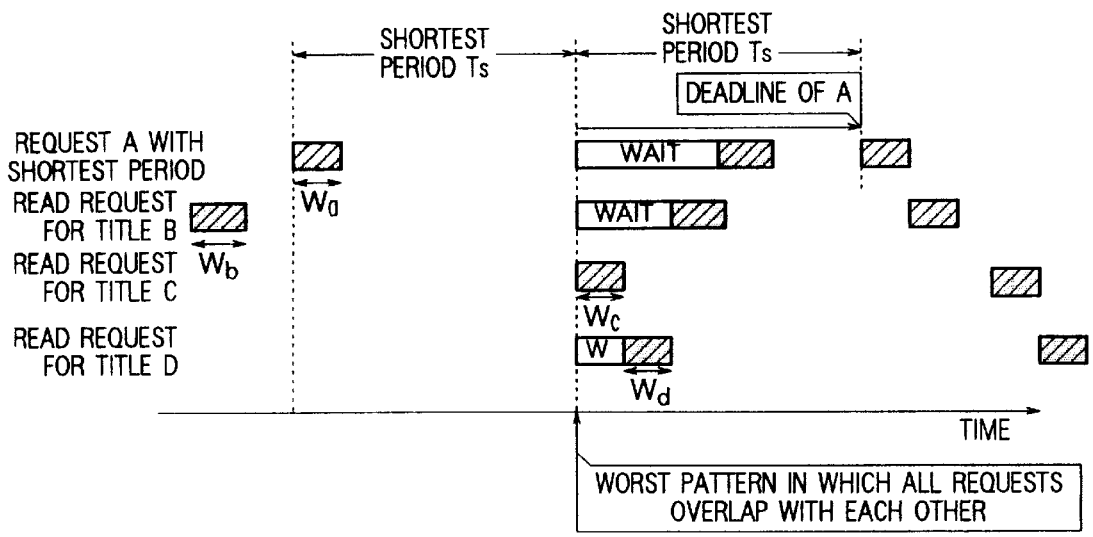

FIGS. 32A to 32C show relationships between access requests (tasks) for magnetic disks and access timings of the magnetic disks. The ordinate represents the time axis.

FIG. 32A is a timing chart when all tasks occur with an identical period. In this case, when the task start phase is shifted for each task, the accesses to the magnetic disks are also distributed with respect to time. However, in an actual application, the bit rate varies between the video streams related to the access requests. Consequently, it is difficult to achieve pre-read operations of the respective video titles with the same period.

FIG. 32B is a timing chart of access operations when the tasks have mutually different periods.

When two or more read requests are issued, from the video channel delivery control block, it is necessary to initiate the respective tasks with an interval time therebetween to access magnetic disks. In this case, when the time delay from the issuance of the access request to the initiation of the data access to the actual magnetic disk device is increased, it will be impossible in some cases to process the respective access requests in conformity with the deadlines thereof. The worst case of the access delay of a magnetic disk takes place when a plurality of access requests are simultaneously issued to the disks.

FIG. 32C is a timing chart of access requests when all disk access requests are unfortunately issued at the same time.

Timeout due to the deadline is most likely to occur when a request A having the shortest access period Ts from among a plurality of access requests is executed as the last request. When the deadline is not exceeded in such a worst case, the access operations can be appropriately conducted for any other deadlines. Description will now be given of conditions for the appropriate access operations. considering only periodic accesses, the condition to guarantee the quality of service for all video streams is as follows.

Assume that the period of time in which each read request occupies a magnetic disk is Wn and the shortest access period is Ts. When the following condition is satisfied, the deadline of each of the periodic access requests to the magnetic disks can be guaranteed.

$$Ts \geq \Sigma Wn \qquad \text{Condition 1}$$

Next, description will be given of conditions for the appropriate access operations conforming to the deadline even when a new periodic access request or a non-periodic and single access request is issued. The objective access requests are as follows.

(1) New delivery request from new client
(2) Special reproduction request from client to which data is being delivered
(3) Single and non-periodic access request to magnetic disk As described above, in a system using the data pre-read operation, when a special reproduction request as classified into Item 2 above is issued, data already read in advance is assumed to be invalid. Consequently, there is executed an operation similar to the operation to be conducted at an occurrence of a new periodic access request. Namely, the preceding access requests are required to be stopped.

Figure 33A:
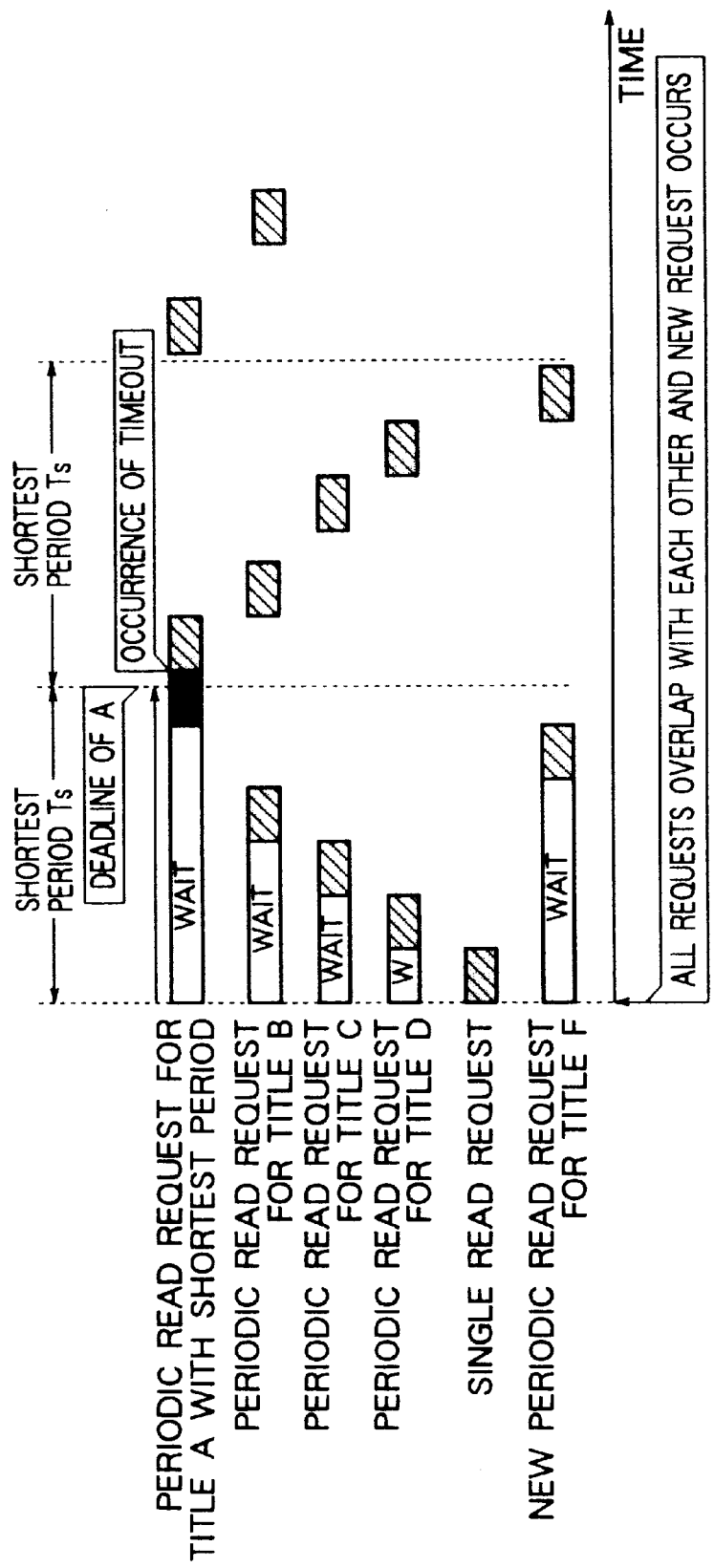

FIG. 33A is a timing chart showing a case in which timeout occurs for a periodic access request having the shortest period Ts because all access requests are required to be occasionally executed in a certain range of time and a new access request and a single access request are received at the same time. To prevent the timeout to guarantee the quality of service for clients, it is required to observe the deadline for the periodic access request A having the shortest period of Ts. For this purpose, the access of a new read request F need only be delayed as shown in FIG. 33B.

Assume that a data block related to the new access request F has a block size Ck and there is required a magnetic disk occupation time Wk to read or to write the data block. The value of Wk can be computed as follows.

$$Wk = Ck / F(Ck) \tag{2}$$

Assume that a magnetic disk occupation time Dj is necessary for a new access request or a single access request already occurred at a point of time Tj and the total magnetic disk occupation time of access requests received during the preceding period of time Ts, namely, the previous period of time expressed by the short period of time Ts is D(total). The value of D(total) is expressed as follows.

$$D(total) = \Sigma Dj \quad (if\ Ts > (Tc - Tj)) \tag{3}$$

The total of access requests W(total) is obtained from the following expression.

$$W(total) = \Sigma Wn \tag{4}$$

The following condition guarantees the deadline of the access request having the shortest period Ts even when a new access request is received.

$$Ts \geq (W(total) + D(total) + Wk) \qquad \text{Condition 2}$$

When condition (2) is satisfied, a new access is request is acceptable (the access is executable); otherwise, the request is required to be temporarily reserved. When a certain period of time lapses with the new access request kept reserved, the value of D(total) of expression 3 is decreased to satisfy condition 2. Consequently, the access request kept reserved at this point of time becomes acceptable.

Figure 34:
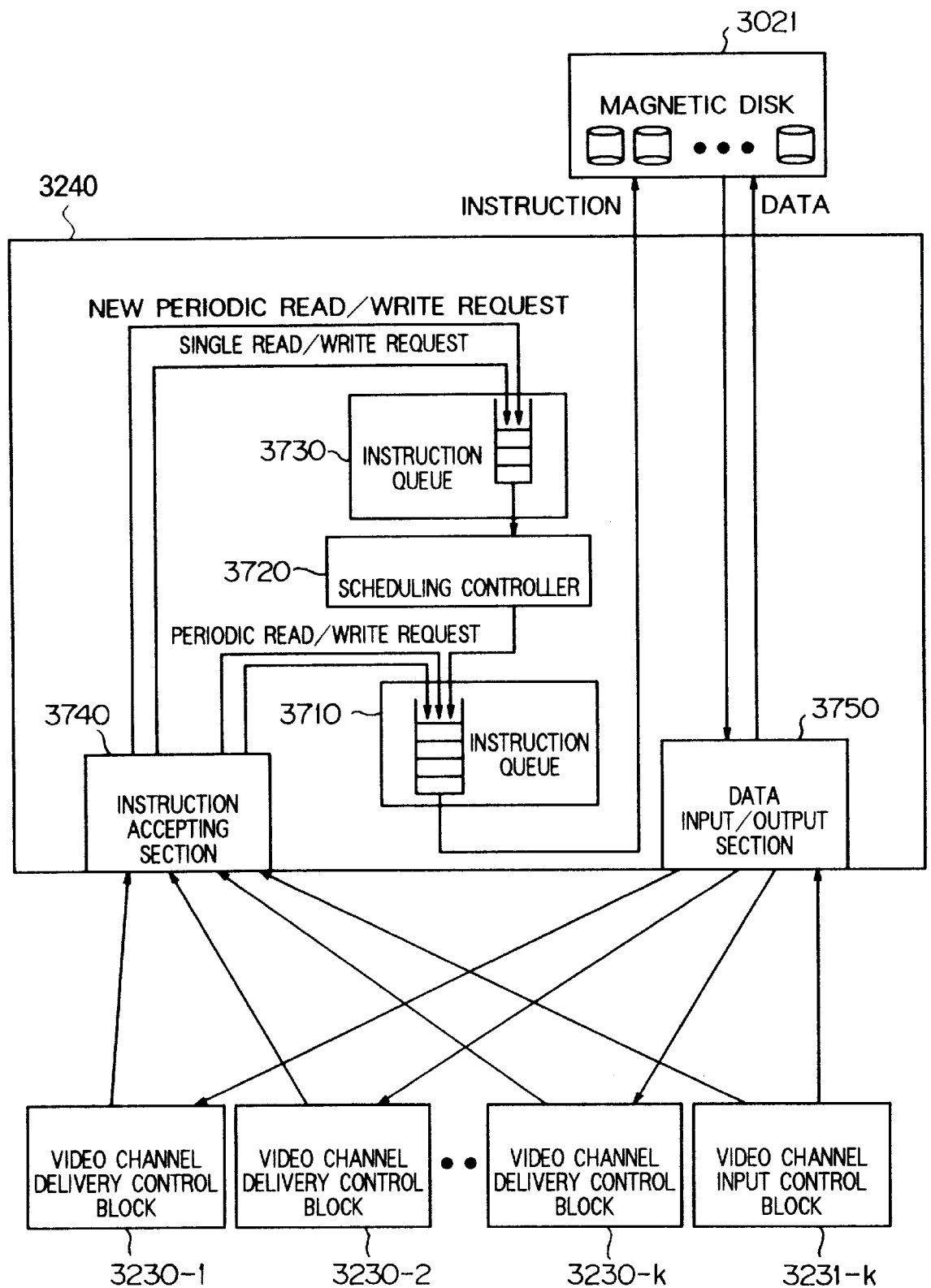
FIG. 34 is a diagram for explaining functions of a control block of magnetic disks.

FIG. 34 shows in detail the configuration of the magnetic disk control block 3240 of FIG. 29. A reference numeral 3710 designates an instruction queue, a numeral 3720 denotes a schedule control section, a numeral 3730 denotes an instruction queue for new access request, a numeral 3740 indicates an instruction accepting section, and a numeral 3750 denotes a data input/output section.

The instruction accepting section 3740 receives a magnetic disk access request instruction from each delivery control block 3230 or the input control block 3231. When the request has already been registered as a periodic task, the section 3740 adds the access request to the instruction queue 3710. When the request is a new periodic access request or a single access request, the section 3740 registers the access request to the instruction queue 3730.

The access request to the magnetic disk thus stored in the instruction queue 3730 is immediately passed to the instruction queue 3720 by the scheduling control section 3720 according to the control algorithm. Alternatively, the access request is delayed as already described in conjunction with condition 2 above so as to sent to the instruction queue 3720. The access request to the magnetic disk thus registered to the instruction queue 3710 is sequentially executed according to a first-in-first-out (FIFO) algorithm.

Figure 35:
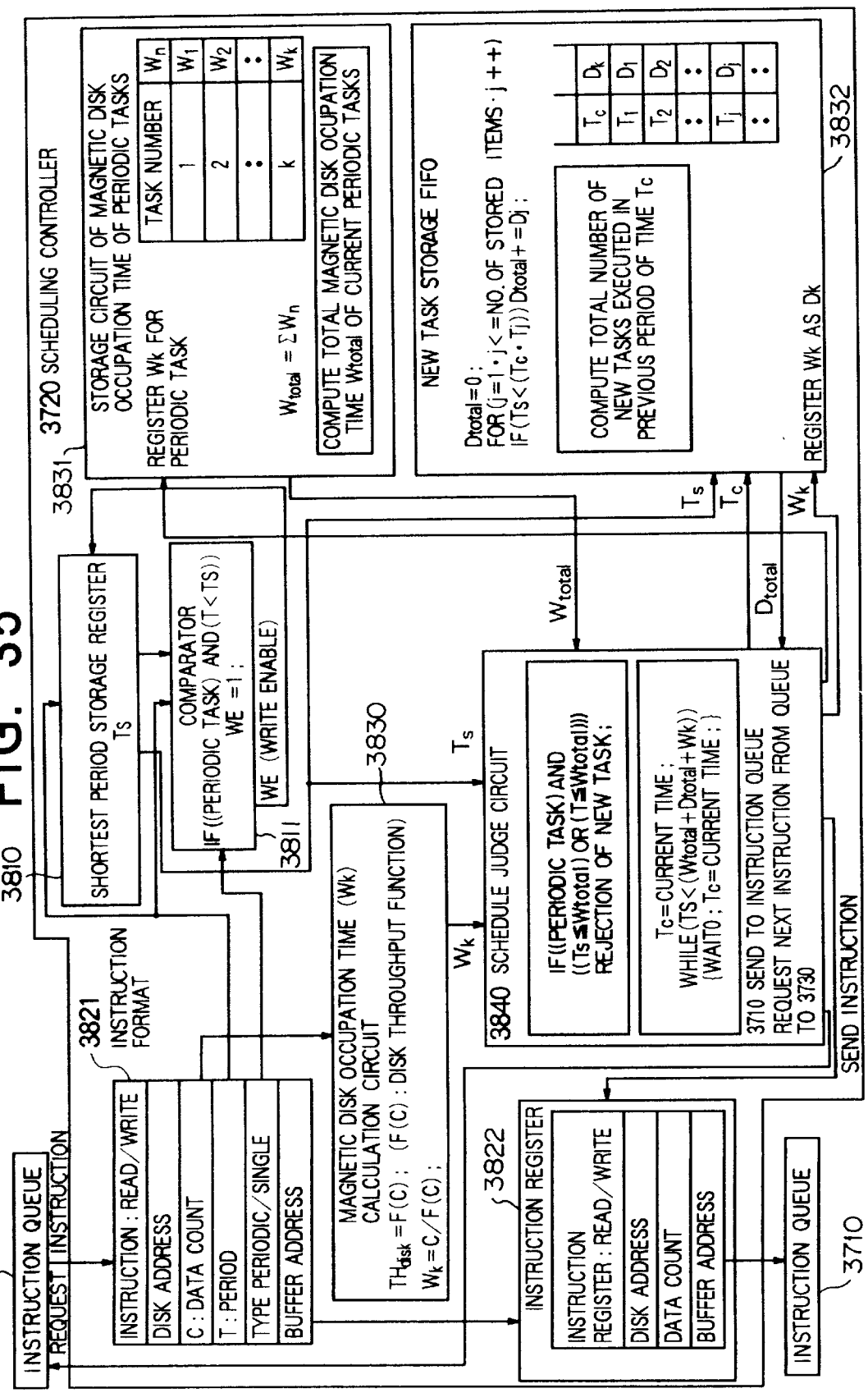
FIG. 35 is a block diagram showing the construction of a schedule controller 3720 of FIG. 34.

FIG. 35 shows in details the configuration of the scheduling controller 3720 of FIG. 34. A reference numeral 3810 designates a shortest period storage register to store therein a shortest period Ts of a periodic access request, a numeral 3811 denotes a comparator, a numeral 3821 indicates a memory to store therein a format of an instruction received from each video channel delivery control block 3230 or the video channel input control block 3231, a numeral 3822 denotes an instruction register to store therein an instruction to be sent to the instruction queue 3710, a numeral 3830 denotes a magnetic disk occupation time calculating circuit to calculate the magnetic disk occupation time for a new access request, a numeral 3821 indicates a magnetic disk occupation time storage circuit to store therein a periodic access request already in execution, a numeral 3832 denotes an FIFO buffer to store therein a new task, and a numeral 3840 denotes a schedule judge circuit to compute condition 2.

On receiving a new access request 3721 from the instruction queue 3730, the schedule controller 3720 carries out a scheduling operation according to the following procedure.

(1) Wk of expression (2) is calculated by the calculating circuit 3830.

(2) W(total) of expression (4) is computed by the computing circuit 3831.

(3) When the new task is a periodic task, whether or not condition (1) is satisfied is determined by the judge circuit 3840. If condition 1 is not satisfied, the request is rejected.

(4) D(total) of expression (3) is calculated according to the new task stored in the FIFO buffer 3832.

(5) Whether or not condition (2) is satisfied is decided by the judge circuit 3840. If not satisfied, the calculation of Item 3 above is executed again to repeatedly conduct judgement for satisfaction of condition (2). If condition (2) is satisfied, the contents of the instruction register 3822 to which information items necessary for the magnetic disk access are beforehand moved from the information items of the instruction format 3821 are sent to the instruction queue 3710. The magnetic disk occupation time Wk of the new access request is registered as Dk to the FIFO register 3822. For a periodic task, Wk is registered to the time storage circuit 3831 of the periodic task. The value stored in the register 3810 is compared with the period T of the new access request by the comparator 3811. If the period T is less than Ts, the period T is stored as a new shortest period Ts.

As a result of the scheduling operation above, the quality of service is guaranteed for pictures being delivered to clients even at an occurrence of (1) a new delivery request from a new client, (2) a special reproduction request from a client to which data is being delivered, or (3) a single and non-periodic access to magnetic disks.

According to the present invention, it is possible to cope with a delivery request for which a video delivery start time is specified. For example, when such a delivery request is issued, a task thereof is registered as a periodic task to the time storage circuit for periodic task 3831 such that only a pre-read operation is first conducted to attain requested video data, and the video delivery control block 3230 is kept remained in a wait state until the specified delivery start time. At the specified time, the control block 3230 is released from the wait state to ordinarily accomplish delivery services. As a result, a read request is issued to the disk control block 3102 after a short period of time. In this situation, since the pertinent task has already been scheduled as a periodic task by the schedule judge circuit 3840, the read request does not disturb the quality of service for other video data being delivered.

As described above, in the video storage and delivery apparatus and the video storage and delivery system according to the present invention, a delivery request can be issued with specification of an arbitrary delivery start time. Consequently, it is possible to achieve a delivery service in which, for example, video pictures of two or more different titles are connected to each other at specified points of time.

Figure 36:
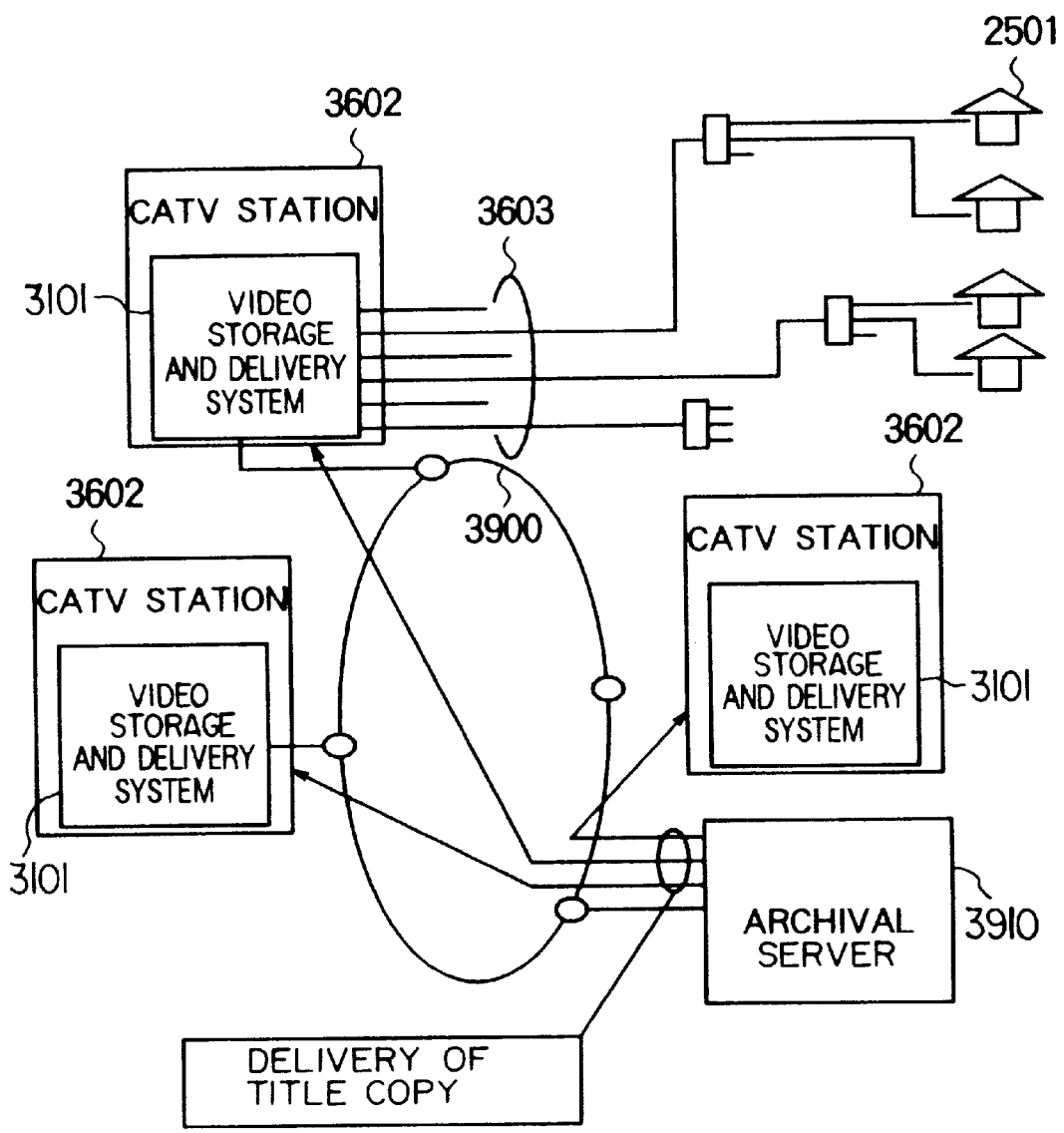
FIG. 36 is a diagram showing another application example of the video storage and delivery apparatus according to the present invention.

FIG. 36 shows an example of application of the present invention to a CATV station. A reference numeral 3900 denotes level-B integrated services digital network (B-ISDN), and a numeral 3910 denotes an archival server connected to a leased or public network 3900 to store therein various video titles. The network 3900 is connected to a CATV station 3602 to achieve such services for each user or family 2501 as the video-on-demand service and the home-shopping service.

Each CATV station 3602 includes a video storage and delivery system 3103 according to the present invention. On receiving a delivery request for a video title from a household or family terminal 2501, the station 3602 delivers compressed image data via a network 3603 to the request source terminal 2501. When the title (video data) requested from the user to the station 3602 is missing in the system 3103, a request is issued to the archival server 3910 for a copy of the title so as to obtain the desired video title by a copy-in operation. In this case, applying the video storage and delivery system 3103 of the present invention to the operation, it is possible even during a delivery service of another video data to copy the video data from the archival server 3910 onto the system 3101 by the copy-in function while guaranteeing the quality of service of the video data in delivery.

Figure 37:
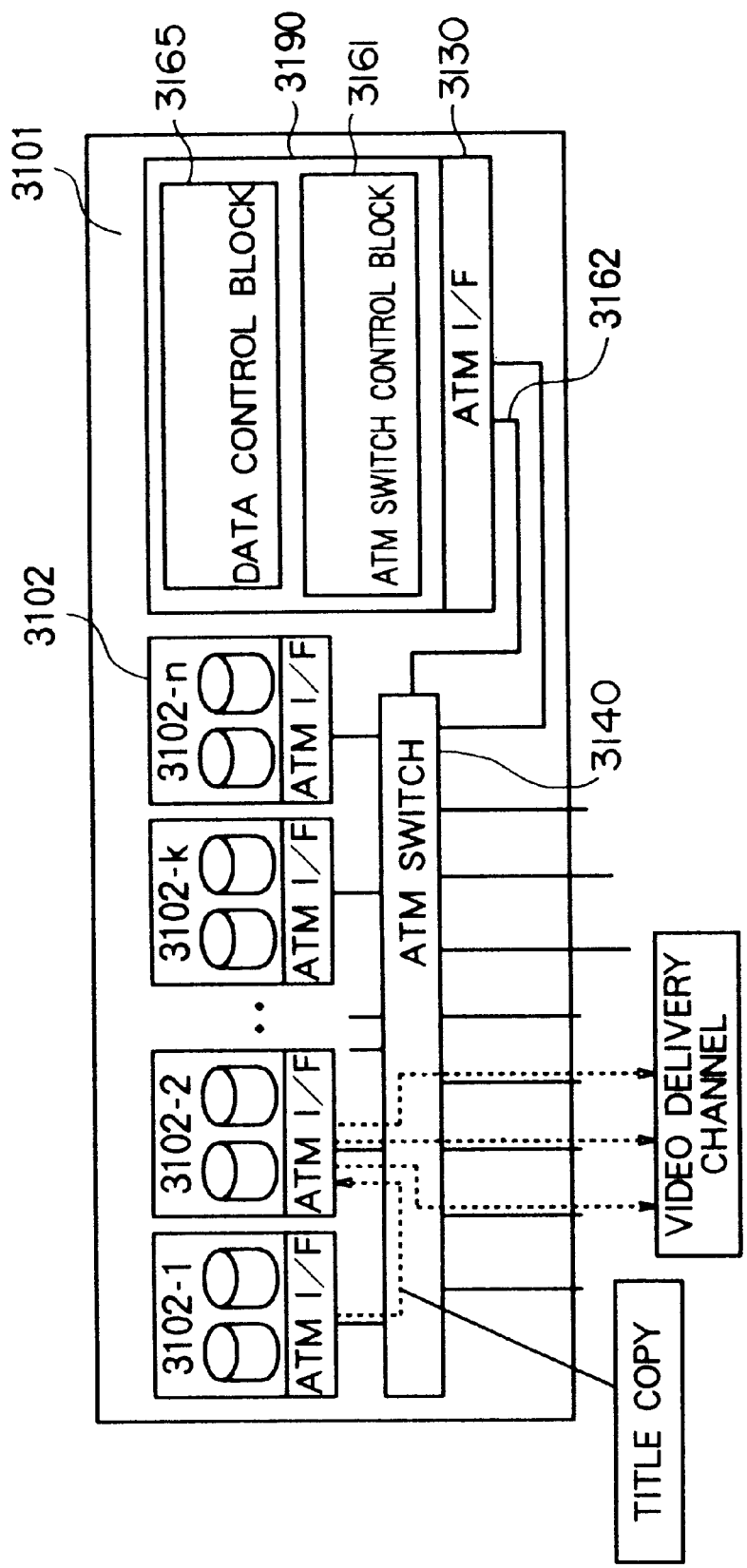
FIG. 37 is a diagram showing still another application example of the video storage and delivery apparatus according to the present invention.

FIG. 37 shows an example of a favorable configuration of the video storage and delivery system 3101 applied to the CATV station 3602 of FIG. 36. The basic constitution of FIG. 37 is the same as that of FIG. 28. Video titles are distributively stored in a plurality of video storage and delivery apparatuses 3102 (3102-1 to 3102-n). In the system configuration, when accesses are concentrated onto a popular title, a particular apparatus 3102-i containing the title becomes a traffic bottleneck, which may disadvantageously restrict the delivery service of the popular title. To cope with the problem, the pertinent title is copied under control of the control unit 2190 from the apparatus 3102-i onto other apparatuses 3102-j to distribute the accesses to a plurality of apparatuses 3102-j, thereby solving the problem of the bottleneck.

Thanks to usage of the video storage and delivery apparatus 3102 according to the present invention, while guaranteeing the quality of service for video channels already in delivery, it is possible, according to the degree of concentration of accesses onto a title, to increase the number of video storage and delivery apparatuses 3102 containing the copy of the title so as to process service requests in a distributed configuration. Similarly, a new title can be added to the apparatuses 3102 without interrupting operation of the system, leading to continuous interactive services such as a video-on-demand service in a CATV station.

Figure 38A:
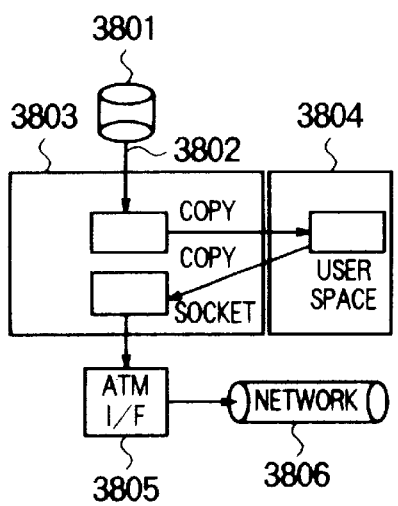
FIGS. 38A to 38C are diagrams showing further another application example of the video storage and delivery apparatus according to the present invention.
Figure 38B:
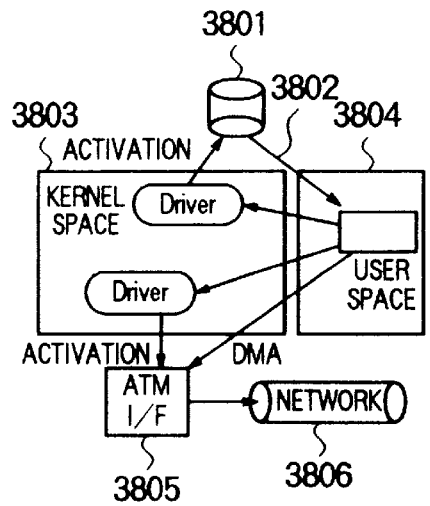
Figure 38C:
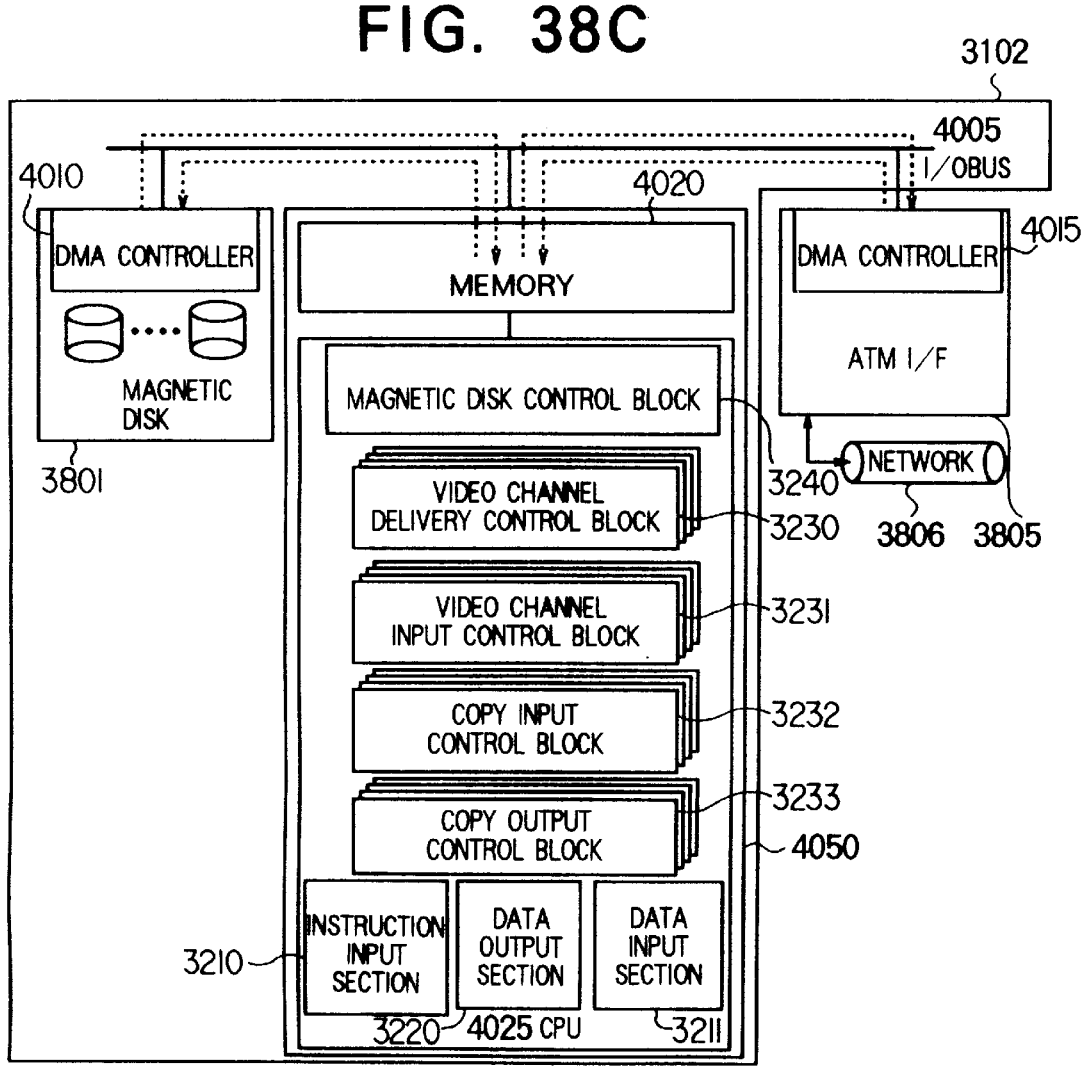

FIG. 38C shows an example of the construction of the video storage and delivery apparatus 3102 according to the present invention. A reference numeral 4005 indicates an input/output bus, numerals 4010 and 4015 denote direct-memory-access (DMA) controllers, a numeral 4050 denotes a control block, a numeral 4020 designates a memory in the block 4050, a numeral 4025 indicates a CPU to execute functions of the block 4050, a numeral 3801 denotes a magnetic disk, a numeral 3805 designates an ATM interface and a numeral 3806 denotes a network.

The CPU 4025 respectively achieves, according to a control thereof, functions of the video channel delivery control block 3230, the video channel input control block 3231, the copy input control block 3231, the copy output control block 3232, the instruction input section 3210, the data output section 3220, the data input section 3211, and the magnetic disk control block 3240 shown in FIG. 29.

FIG. 38A shows a video data transfer method basically using a conventional computer operating with a UNIX operating system, whereas FIG. 38B shows an example of a method of increasing the processing speed in the system configuration of FIG. 38C.

In the conventional method of FIG. 38A, data 3802 read from the magnetic disk 3801 is transferred to a kernel buffer 3803 controlled by a kernel section of the operation system of the CPU. The data 3802 is once copied therefrom onto a user data space 3804 to then be delivered via the ATM interface 3805 or the like to the network 3806. That is, the operation necessitates two memory copy operations by the CPU.

According to the method of the present invention shown in FIG. 38B, a data buffer is disposed in the user memory space 3804 of the memory 4020 such that video data is transferred by the DMA function from the magnetic disk 3801 to the data buffer in the space 3804 to be directly delivered by the DMA function from the data buffer to the ATM interface 3805. The memory copy operation of the CPU is consequently unnecessary and hence the function of simultaneous data delivery to plural video channels is improved. These operations are controlled by the CPU 4025.

Figure 39:
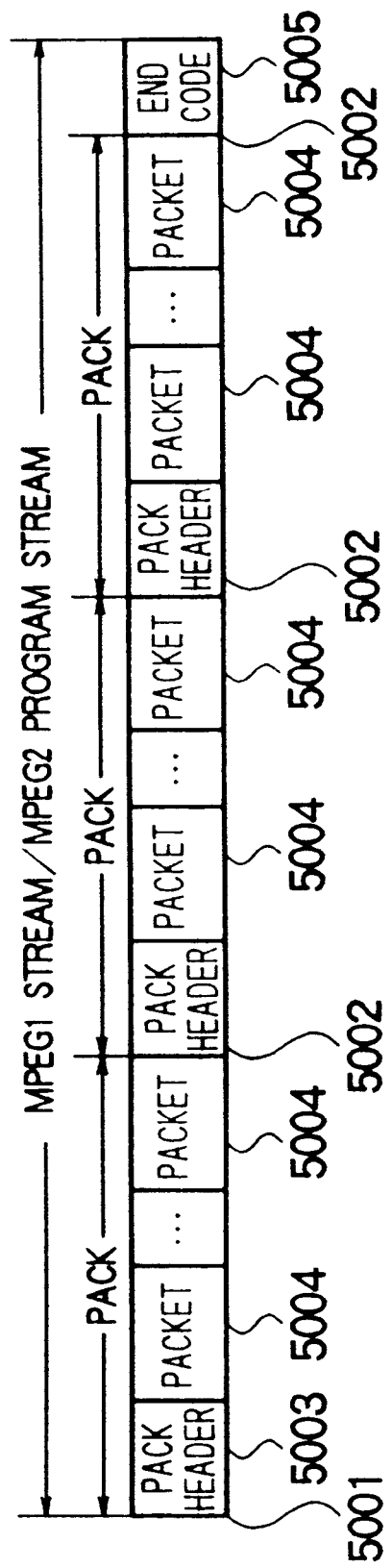
FIG. 39 is a diagram showing the format of an MPEG stream.
Figure 40:
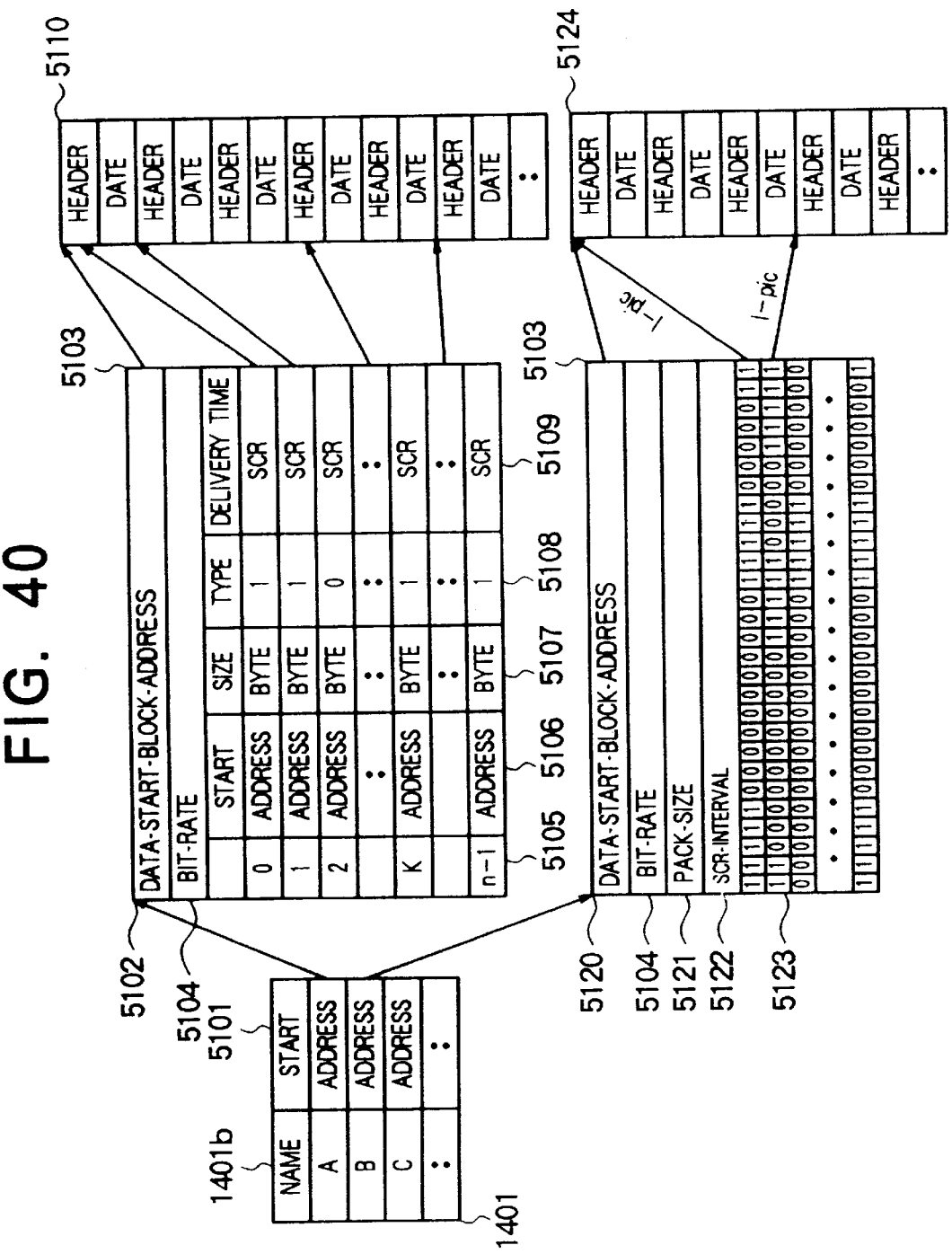
FIG. 40 is a diagram showing a storage method of the MPEG stream.

Referring now to FIGS. 39 and 40, description will be given of a specific example of storing MPEG1 and MPEG2 program streams in a storage device.

FIG. 39 shows an MPEG stream such as an MPEG1 or MPEG2 stream. In this diagram, a reference numeral 5001 indicates an MPEG1 or MPEG2 stream. The MPEG stream includes a plurality of packs 5002. Reference numerals 5003, 5004, and 5005 denote a pack header, a packet, and a stream end code, respectively. The pack header contains a system time reference value called "system clock reference (SCR)". The MPEG stream is decoded according to the SCR to reproduce a picture in conformity with an appropriate time axis. Each pack 5002 includes packets 5004 which are classified into video data packets and audio data packets. The MPEG stream terminates with an end code 5005. MPEG video data 1703 of FIG. 17 is subdivided into video data packets 5004 forming packs. FIG. 40 shows an example of storing the MPEG stream in storage device. FIG. 40 shows a data layout corresponding to the storage format of FIG. 14. File information 1405 of FIG. 14 may be deleted as shown in FIG. 40. In this diagram, a numeral 1401 indicates a route directory, a numeral 140a denotes a title name, and a numeral 5101 designates a start block address of a pack address table 5102. In the table 5102, a numeral 5103 indicates a start block address of the MPEG stream in the storage device. A numeral 5104 denotes a bit rate of the MPEG stream, a numeral 5105 denotes a pack number thereof, a numeral 5106 denotes a pack storage address which is a storage byte address relative to the start block address 5103 of each pack, and a numeral 5107 designates a pack capacity. A reference numeral 5108 denotes a pack type indicating whether or not the pertinent pack contains an intra-picture (I picture). When this field is set, the pack contains an intra-picture. A numeral 5109 indicates a field to store therein SCR of the pack. A numeral 5110 denotes an MPEG stream 5001 for a variable bit rate (VBR) of FIG. 39. The pack address table 5102 of FIG. 39 is added to each MPEG stream 5110 for storage thereof. When a delivery request is accepted, the pack address table 5102 is first loaded in the memory. Thereafter, packs to be delivered are obtained according to the SCR 5109 of the pack address table 5102. For the pack, a storage destination and the capacity of the storage device can be obtained from the pack storage address 5106 and the pack capacity 5107 at a high speed. Consequently, the MPEG stream 5110 having a variable bit rate can be delivered in conformity with the time axis. Even when a request is issued to deliver video data beginning at an arbitrary position thereof or when a request is made to jump to an arbitrary position in a delivery, a storage location of data at the specified position can be immediately detected by reference to the pack address table 5102. Also in a special playback such as a quick forward reproduction, only the related packs containing intrapictures can be read from the storage device so as to be delivered to clients.

Description will next be given of a case of an MPEG stream having a constant bit rate (CBR) in which all packs have the same pack size and the SCR of each pack has the same increment. In FIG. 40, a numeral 5120 designates a pack address table, a numeral 5103 represents a start block address, a numeral 5104 indicates a bit rate, a numeral 5121 designates the size of the pack, and a numeral 5122 denotes the SCR difference SCR-interval between SCRs. A numeral 5123 indicates an I picture bit map in which each bit corresponds to one pack. When this field is set, the pertinent pack contains an I picture, namely, an intra-picture. A numeral 5124 designates a CBR MPEG stream in which all packs have the same pack size and the SCR of each pack has the same increment. In a normal playback or reproduction, an address of data to be read from the storage device can be calculated according to the bit rate 5104, the pack size 5121, and the SCR-interval 5122. Also in a special reproduction, packs containing intra-pictures can be rapidly detected according to the I picture bit map 5123. For the CBR MPEG stream 5123, the capacity necessary for the pack address table can be reduced.

As can be seen from the description of the embodiments above, according to the video storage and delivery apparatus of the present invention, video data can be simultaneously delivered to a plurality of users while guaranteeing the quality of video data, thereby flexibly coping with requirements of the video storage capacity and the number of channels available for services at the same time.

While the present invention has been described with reference to the particular illustrative embodiments, it is not to be restricted by those embodiments but only by the appended claims. It is to be appreciated the those skilled in the art can change or modify the embodiments without departing from the scope and spirit of the present invention.

We claim:

1. A data transfer method for use with a data transfer system including a plurality of video storage and delivery apparatuses for accumulating video data therein, a plurality of clients for transmitting and/or receiving video data, a switch for selectively connecting the apparatuses to the clients, and a control unit connected to the apparatuses and the clients, the method comprising the steps of:

sending a signal of a request to access the apparatuses from the client to the control unit;

sending, by the control unit having received the request signal, a control instruction to the switch; and controlling the switch and thereby connecting a particular one of the apparatuses to the client, wherein the control unit stores a quality of service (OOS) control table indicating relationships of connections between the apparatuses and the clients.

2. A data transfer method according to claim 1, wherein the control unit references the QOS control table and thereafter indicates the switch to connect the client to the particular apparatus and updates the QOS control table after indicating the connection.

\* \* \* \* \*